United States Patent [19]
Tsuruoka et al.

[11] 3,761,588
[45] Sept. 25, 1973

[54] ANTIBIOTICS AND PRODUCTION THEREOF

[75] Inventors: Takashi Tsuruoka, Kawasaki-shi; Takashi Shomura; Norio Ezaki, both of Yokohama-shi; Eiichi Akita, Tokyo; Shigeharu Inoue, Yokohama-shi; Shunzo Fukatsu, Tokyo; Shoichi Amano, Kawasaki-shi; Hiroshi Watanabe; Taro Niida, both of Yokohama-shi, all of Japan

[73] Assignee: Meiji Seika Kaisha, Ltd., Tokyo, Japan

[22] Filed: Jan. 19, 1970

[21] Appl. No.: 3,809

[30] Foreign Application Priority Data
Feb. 6, 1969   Japan.................................. 44/8588
Sept. 25, 1969 Japan................................ 44/75845

[52] U.S. Cl. ............................................... 424/121
[51] Int. Cl............................................ A61k 21/00
[58] Field of Search...................................... 424/121

[56] References Cited
UNITED STATES PATENTS
3,118,812   1/1964   Gaeumann et al.................. 424/121
3,345,262  10/1967   Meyer et al........................ 424/121

Primary Examiner—Albert T. Meyers
Assistant Examiner—Daren M. Stephens
Attorney—Larson and Taylor

[57] ABSTRACT

New and useful antibiotic substances which are called the SF-837 substance, SF-837-$A_2$ substance, SF-837-$A_3$ substance and SF-837-$A_4$ substance, respectively and which are all valuable for the treatment of infections by Gram-positive pathogenic bacteria may be isolated from the culture of a new micro-organism Streptomyces mycarofaciens.

6 Claims, 10 Drawing Figures

ANTIBIOTICS AND PRODUCTION THEREOF

This invention relates to new and useful antibiotic substances called SF-837 substance, SF-837-$A_2$ substance, SF-837-$A_3$ substance and SF-837-$A_4$ substance, respectively, and further to the production of these antibiotic substances and the isolation of each of these antibiotic substances.

We have now found that new antibiotic substances which exhibit powerful growth-inhibitory action against Gram-positive pathogenic bacteria and antibiotics-resistant pyogenic bacteria are produced in a culture of a micro-organism which belongs to the genus Streptomyces, that such new antibiotic substances may be recovered from the culture of said micro-organism, and that these new antibiotic substances are remarkably effective in inhibiting the growth of various kinds of pathogens such as *Staphylococcus aureus*. We have designated these new and useful antibiotics SF-837 substance, SF-837-$A_2$ substance, SF-837-$A_3$ substance and SF-837-$A_4$ substance, respectively.

All the SF-837, SF-837-$A_2$, SF-837-$A_3$ and SF-837-$A_4$ substances are effective in inhibiting the growth of Gram-positive bacteria as well as the growth of pathogenic bacteria which are resistant to the known antibiotics. The SF-837, SF-837-$A_2$, SF-837-$A_3$ and SF-837-$A_4$ substances are substantially non-toxic and exhibit therapeutic effect on infections of Gram-positive bacteria in human beings and animals.

According to a first aspect of the present invention, therefore, there is provided an antibiotic substance effective in inhibiting the growth of Gram-positive bacteria, selected from SF-837 substance, SF-837-$A_2$ substance, SF-837-$A_3$ substance and SF-837-$A_4$ substance and acid-addition salts thereof, as well as the di-acetyl derivative of the SF-837 substance, the di-acetyl derivative of the SF-837-$A_2$ substance, the mono-acetyl derivative of the SF-837-$A_3$ substance and the mono-acetyl derivative of the SF-837-$A_4$ substance each of the SF-837, SF-837-$A_2$, SF-837-$A_3$ and SF-837-$A_4$ substances being such a substance which is soluble in methanol, ethanol, acetone, chloroform, ethyl acetate, butyl acetate, acidified water, benzene, ethyl ether and carbon tetrachloride but is sparingly soluble in petroleum ether, n-hexane and neutral water, which is basic, forms salts with acids, which is positive in the erythromycin test with 50 percent sulfuric acid but is negative in the reactions with ninhydrin reagent and ferric chloride reagent, which contains only the elements carbon, hydrogen, nitrogen and oxygen, which is levorotatory in ethanol and which exhibits the characteristic of the macrolide antibiotics the detailed, properties of the SF-837 substance being that the SF-837 substance free base forms a white powder having a melting point of 122°–124°C, shows a pKa' value of 6.9 in 50 percent aqueous ethanol, gives an elementary analysis C 60.38 percent, H 8.35 percent, N 1.65 percent and O the balance (29.62 percent), shows a molecular weight of 813 as determined by mass analysis, hence has an empirical formula $C_{41}H_{67}O_{15}N$, exhibits an optical rotation of $[\alpha]_D^{22}$ −67° at a concentration of 1 percent in ethanol, exhibits a characteristic absorption maximum in the ultra-violet region of spectrum when dissolved in ethanol at the following wave length in m$\mu$: ($E_{1cm}^{1\%}$ = 325) and exhibits characteristic absorption bands in the infra-red region of spectrum when pelleted in the form of the free base in potassium bromide at the following wave numbers in cm$^{-1}$: 3500, 2970, 2930, 1735, 1460, 1408, 1376, 1360, 1330, 1295, 1275, 1190, 1165, 1120, 1082, 1050, 1015, 910, 860, 840, 805, 780, 735 and 680; the diacetyl derivative of the SF-837 substance forms white colored needles of a melting point of 122–125°C when recrystallised from carbon tetrachloride, gives an elementary analysis C 60.35 percent, H 8.02 percent, N 1.58 percent and O 30.05 percent (balance) and an empirical formula $C_{45}H_{71}O_{17}N$, exhibits a characteristic absorption maximum at 232 m$\mu$ ($E_{1cm}^{1\%}$ = 295) in the ultra-violet region of spectrum when dissolved in ethanol and exhibits characteristic absorption bands in the infra-red region of spectrum when pelleted in potassium bromide at the following wave numbers in cm$^{-1}$: 3450, 2970, 2930, 1728, 1454, 1368, 1232, 1167, 1122, 1082, 1054, 1024, 1002, 957, 907, 863, 837, 783 and 762; and the detailed properties of the SF-837-$A_2$ substance being that the SF-837-$A_2$ substance free base forms a white colored powder having a melting point of 125°–128°C, shows a pKa' value of 6.8 in 50 percent aqueous ethanol, gives an elementary analysis C 60.58 percent, H 8.85 percent, N 1.72 percent and O the balance (28.85 percent), shows a molecular weight of 827 as determined by mass analysis, hence has an empirical formula $C_{42}H_{69}O_{15}N$, exhibits an optical rotation of $[\alpha]_D^{22}$ −68° at a concentration of 1 percent in ethanol, exhibits a characteristic absorption maximum at a wave length of 232 m$\mu$ ($E_{1cm}^{1\%}$ = 320) in the ultra-violet region of spectrum when dissolved in ethanol and exhibits characteristic absorption bands in the infra-red region of spectrum when pelleted in the form of the free base in potassium bromide at the following wave numbers in cm$^{-1}$: 3500, 2970, 2935, 1737, 1460, 1410, 1377, 1360, 1300, 1275, 1190, 1170, 1123, 1082, 1052, 1017, 990, 920, 910, 860, 840, 805, 780, 740 and 700; The di-acetyl derivative of the SF-837-$A_2$ substance forms white colored needles of a melting point of 130°–134°C, gives an elementary analysis C 60.68 percent, H 8.23 percent, N 1.49 percent and O 29.60 percent (balance) and hence has an empirical formula $C_{46}H_{73}O_{17}N$; and the detailed properties of the SF-837-$A_3$ substance being that the SF-837-$A_3$ substance free base forms a white colored powder having a melting point of 122°–125°C, shows a pKa' value of 7.0 in 50 percent aqueous ethanol, gives an elementary analysis C 60.53 percent, H 8.23 percent, N 1.87 percent and O the balance (29.32 percent), shows a molecular weight of 811 as determined by mass analysis, hence has an empirical formula $C_{41}H_{65}O_{15}N$, exhibits an optical rotation of $[\alpha]_D^{22}$ −42° at a concentration of 1 percent in ethanol, exhibits a characteristic absorption maximum at a wave length of 280m$\mu$ ($E_{1cm}^{1\%}$ = 295) in the ultra-violet region of spectrum when dissolved in ethanol and exhibits characteristic absorption bands in the infra-red region of spectrum when pelleted in the form of the free base in potassium bromide at the following wave numbers in cm$^{-1}$: 3500, 2970, 2930, 1738, 1680, 1640, 1600, 1460, 1378, 1360, 1300, 1275, 1252, 1190, 1168, 1121, 1083, 1052, 1015, 980, 910, 863, 840, 805, and 780; the mono-acetyl derivative of the SF-837-$A_3$ substance forms sand-like crystals of a melting point of 182°–185°C, gives an elementary analysis C 60.56 percent, H 7.92 percent, N 1.68 percent, and O 29.84 percent (balance) and hence has an empirical formula $C_{43}H_{67}O_{16}N$; and the detailed properties of the SF-837-$A_4$ substance being that the SF-837-A₄ substance free base forms a white colored powder having a melting point of 120°–122°C, shows a pKa' value of 7.0 in 50 percent aqueous ethanol, gives an elementary analysis C 60.82 percent, H 8.52 percent, N 1.73 percent and O the balance (28.93 percent), shows a molecular weight of 825 as determined by mass analysis, hence has an empirical formula $C_{42}H_{67}O_{15}N$, exhibits an optical rotation of $[\alpha]_D^{22}$ $-40°$ at a concentration of 1 percent in ethanol, exhibits a characteristic absorption maximum at a wave length of 280 mμ ($E_{1cm}^{1\%}$ = 285) in the ultra-violet region of spectrum when dissolved in ethanol and exhibits characteristic absorption bands in the infra-red region of spectrum when pelleted in the form of the free base in potassium bromide at the following wave numbers in $cm^{-1}$: 3500, 2970, 2930, 1738, 1680, 1640, 1600, 1460, 1378, 1360, 1300, 1276, 1252, 1190, 1170, 1120, 1082, 1052, 1017, 980, 920, 910, 863, 840 and 780; the mono-acetyl derivative of the SF-837-A₄ substance forms sand-like crystals of a melting point of 166°–168°C, gives an elementary analysis C 60.85 percent, H 8.06 percent, N 1.65 percent and O 29.44 percent (balance) and hence has an empirical formula $C_{44}H_{69}O_{16}N$.

We have not found that any of the SF-837, SF-837-A₂, SF-837-A₃ and SF-837-A₄ substances contain the elements sulfur, phosphorus and halogen.

When the erythromycin test is effected with 50 percent sulfuric acid, the SF-837 substance and SF-837-A₂ substance give a brownish and reddish purple color, while the SF-837-A₃ substance and SF-837-A₄ substance give a light yellowish brown color.

As the acid-addition salts of the SF-837, SF-837-A₂, SF-837-A₃ and SF-837-A₄ substances of the present invention, there may be mentioned, for example, salt of these substances with non-toxic organic and inorganic acids such as hydrochloric acid, sulfuric acid, hydrobromic acid, phosphoric acid, nitric acid, acetic acid, citric acid, maleic acid, malic acid, tartaric acid, cinnamic acid, ascorbic acid, glycolic acid and the like.

Referring to the attached drawings.

Figure 1:
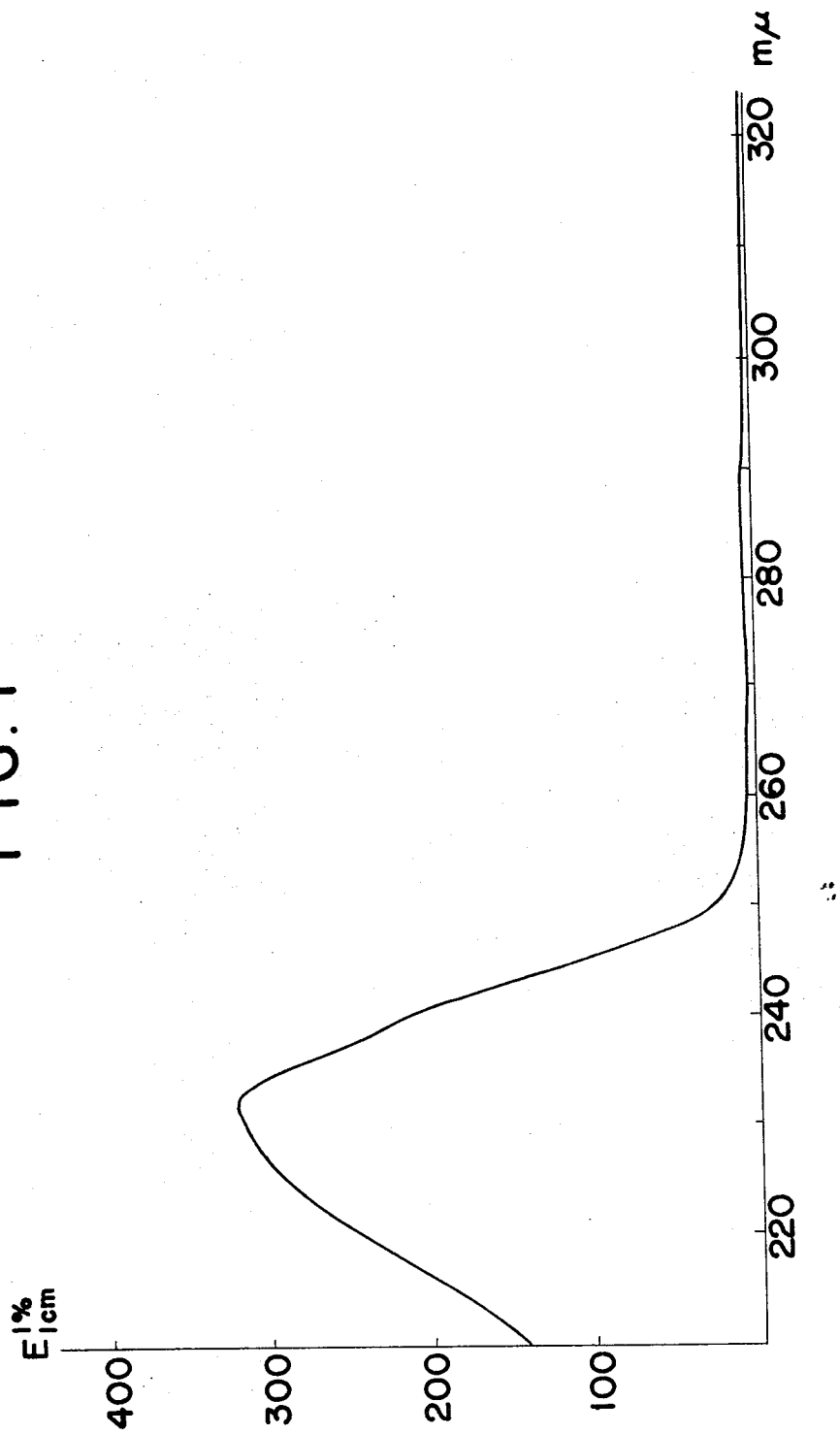
FIG. 1 shows a curve of the ultra-violet absorption spectrum of the SF-837 substance in the form of the free base dissolved in ethanol.
Figure 2:
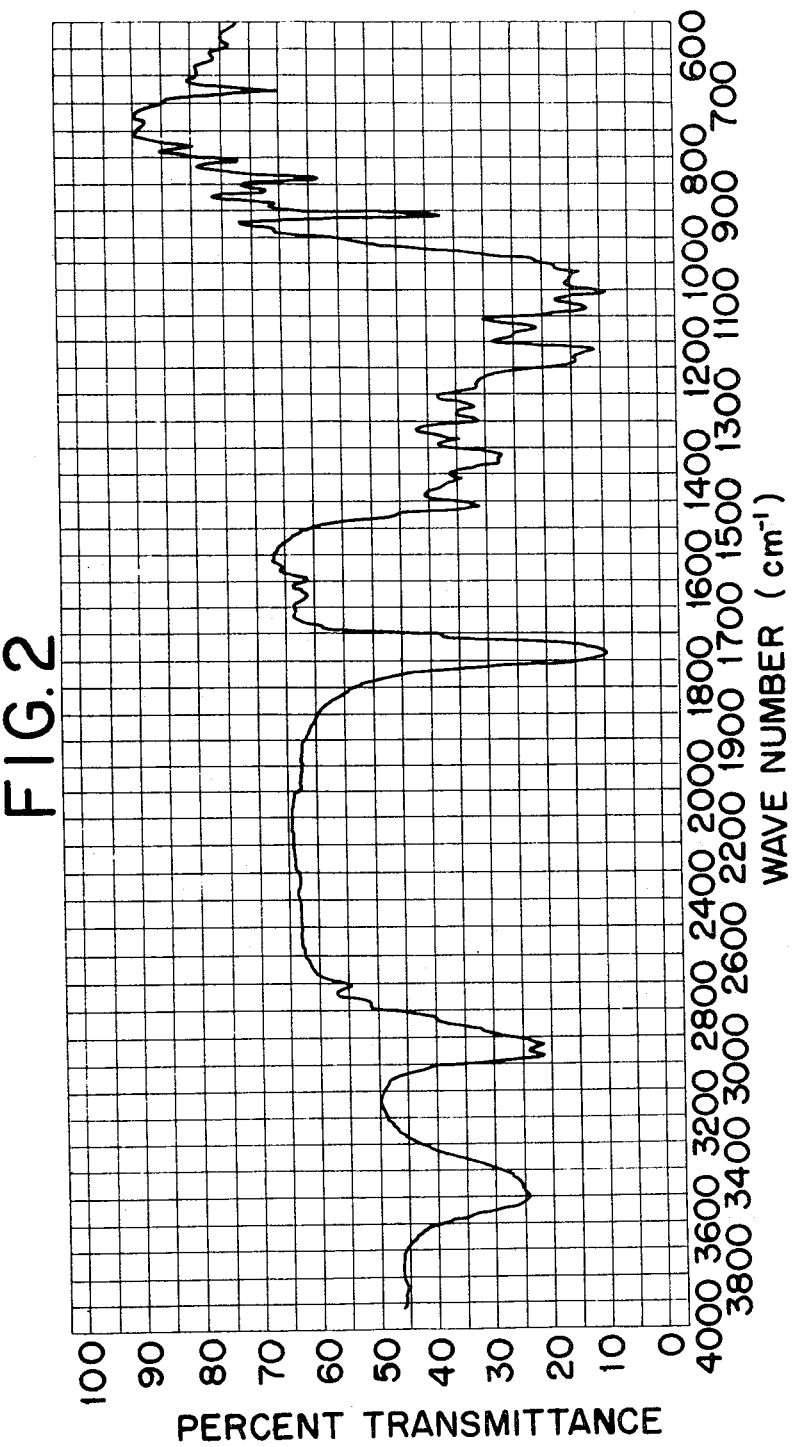
FIG. 2 shows a curve of the infra-red absorption spectrum of the SF-837 substance free base pelleted in potassium bromide.

When the SF-837, SF-837-A₂, SF-837-A₃ and SF-837-A₄ substances are subjected to silica gel or alumina thin layer chromatography using various solvent systems, we have found that they give a single spot with different Rf-values, respectively, so that the purity and homogeneity of these substances may be confirmed.

The Rf values of these substances for different solvent systems are tabulated in Table 1 below.

TABLE 1

| | | Rf-Value | | |
|---|---|---|---|---|
| | SF-837 | SF-837-A₂ | SF-837-A₃ | SF-837-A₄ |
| Solvent systems | substance | substance | substance | substance |
| Silica gel thin layer chromatography | | | | |
| Benzene-acetone (2:1) | 0.45 | 0.51 | 0.50 | 0.55 |
| n-Butanol-Acetic acid-Water (3:1:1) | 0.67 | 0.68 | 0.68 | 0.69 |
| Methanol | 0.82 | 0.83 | 0.83 | 0.84 |
| Alumina thin layer chromatography | | | | |
| Ethyl acetate-Benzene(2:1) | 0.34 | 0.40 | 0.45 | 0.52 |
| Etyl acetate | 0.78 | 0.84 | 0.87 | 0.91 |

The anti-bacteial spectra of the SF-837, SF-837-A₂, SF-837-A₃ and SF-837-A₄ substances and their acetyl derivatives are shown in Table 2 below. The minimum inhibitory concentrations of these new antibiotics were determined by using the broth dilution method with various culture media as indicated in Table 2.

TABLE 2

| | Minimum inhibitory concentration (mcg./ml.) | | | | | | | | |
|---|---|---|---|---|---|---|---|---|---|
| Test micro-organisms | SF-837 substance | Diacetyl-SF-837 substance | SF-837-A₂ substance | Diacetyl-SF-837-A₂ substance | SF-837-A₃ substance | Monoacetyl-SF-837-A₃ substance | SF-837-A₄ substance | Monoacetyl-SF-837-A₄ substance | Culture media used |
| Staphylococcus aureus 209p | 0.39 | 0.78 | 0.39 | 0.78 | 0.39 | 0.78 | 0.39 | 0.78 | 1 |
| Staphylococcus aureus 209p resistant to penicillin | 0.78 | 0.78 | 0.39 | 0.39 | 0.39 | 0.39 | 0.39 | 0.39 | 1 |
| Staphylococcus aureus 209p resistant to streptomycin and A-249 substance | 0.39 | 0.39 | 0.39 | 0.78 | 0.39 | 0.39 | 0.78 | 0.78 | 1 |
| Staphylococcus aureus 209p resistant to novobiocin | 3.125 | 6.25 | 12.5 | 12.5 | 12.5 | 12.5 | 12.5 | >25 | 1 |
| Staphylococcus aureus 209p resistant to actinomycin | 0.39 | 0.78 | | | | | | | 1 |
| Staphylococcus aureus 209p resistant to kanamycin | 3.125 | 6.25 | 0.78 | 1.56 | 0.78 | 1.56 | 0.78 | 1.56 | 1 |
| Staphylococcus aureus Smith | 0.39 | 0.78 | 0.1 | 0.2 | 0.2 | 0.2 | 0.2 | 0.4 | 1 |
| Staphylococcus aureus Terajima | 0.78 | 0.78 | 0.39 | 0.78 | 0.78 | 1.56 | 0.78 | 1.56 | 1 |

TABLE 2 —Continued

| Test micro-organisms | Minimum inhibitory concentration (mcg./ml.) | | | | | | | | Culture media used |
|---|---|---|---|---|---|---|---|---|---|
| | SF-837 substance | Diacetyl-SF-837 substance | SF-837-$A_2$ substance | Diacetyl-SF-837-$A_2$ substance | SF-837-$A_3$ substance | Monoacetyl-SF-837-$A_3$ substance | SF-837-$A_4$ substance | Monoacetyl-SF-837-$A_4$ substance | |
| Staphylococcus aureus resistant to streptomycin, penicillin and tetracycline | 1.56 | 6.25 | 0.78 | 1.56 | 1.56 | 3.125 | 1.56 | 3.125 | 1 |
| Staphylococcus aureus 193 | 1.56 | 3.125 | | | | | | | 1 |
| Bacillus subtilis ATCC 6633 | 0.39 | 0.78 | 0.2 | 0.4 | 0.39 | 0.78 | 0.39 | 1.56 | 1 |
| Sarcina lutea | 0.05 | 0.10 | 0.05 | 0.1 | 0.1 | 0.2 | 0.1 | 0.1 | 1 |
| Escherichia coli | >25 | >25 | >25 | >25 | >25 | >25 | >25 | >25 | 1 |
| Pseudomonas aeruginosa | >25 | >25 | >25 | >25 | >25 | >25 | >25 | >25 | 1 |
| Proteus vulgaris | >25 | >25 | >25 | >25 | >25 | >25 | >25 | >25 | 1 |
| Klebsiella pneumoniae | >25 | >25 | | | | | | | 1 |
| Shigella dysenteriae | >25 | >25 | | | | | | | 1 |
| Mycobacterium smegmatis 607 | >25 | >25 | 12.5 | >25 | >25 | >25 | >25 | >25 | 2 |
| Mycobacterium phlei | 12.5 | 12.5 | | | | | | | 2 |
| Candida albicans | >25 | >25 | >25 | >25 | >25 | >25 | >25 | >25 | 3 |
| Penicillium chrysogenum | >25 | >25 | >25 | >25 | >25 | >25 | 2>5 | >25 | 3 |
| Aspergillus niger | >25 | >25 | | | | | | | 3 |
| Saccharomyces cerevisiae | >25 | >25 | | | | | | | 3 |

Referring to Table 2, the culture madia used were as follows:

1 : Heart infusion medium.
2 : Glycerine bouillon medium.
3 : Sabouraud medium.

From the results of Table 2, it is clear that the SF-837, SF-837-$A_2$, SF-837-$A_3$ and SF-837-$A_4$ substances all have useful antibacterial activity against Gram-positive bacteria as well as pyogenic bacteria which are resistant to the known antibiotics. Furthermore, advantageously it has not been found that the antibacterial activity of the SF-837, SF-837-$A_2$ SF-837-$A_3$ and SF-837-$A_4$ substances can be inactivated by serum.

From the results of test for toxicity by oral and parenteral administration, it has been found that the SF-837, SF-837-$A_2$, SF-837-$A_3$ and SF-837-$A_4$ substances of the present invention are all of low toxicity. Thus, when the free bases of them were orally dosed to mice, they exhibited $LD_{50}$ values of 3,200 mg/kg, 3,100 mg/kg, 2,900 mg/kg and 2,850 mg/kg, respectively.

Furthermore, it has been observed that the SF-837, SF-837-$A_2$, SF-837-$A_3$ and SF-837-$A_4$ substances (free bases) as well as their acetyl derivatives of the present invention are all useful as the antibiotics in practice.

Thus, the SF-837 substance free base was tested for the therapeutic effect by injecting subcutaneously an aqueous suspension of the SF-837 substance at the femoral region of ICR mice which had lethally been infected by intraperitoneal injection of Staphylococcus aureus Smith strain at a dosage of 10 times higher than its $LD_{50}$ value. It was then estimated that the SF-837 substance free base had a very much useful $CD_{50}$ value of 51 mg/kg. In the treatment of ICR mice infected with an amount of 100 times of $LD_{50}$ of Streptococcus haemolyticus Ti-125 Gr-A Type I strain, oral administration of the free bases of the SF-837, SF-837-$A_2$, SF-837-$A_3$ and SF-837-$A_4$ substances exhibited the following $CD_{50}$ values of 120 mg/kg, 135 mg/kg, 170 mg/kg and 155 mg/kg, respectively.

The therapeutic effect of the di-acetyl derivative of the SF-837 substance, the di-acetyl derivative of the SF-837-$A_2$ substance, the mono-acetyl derivative of the SF-837-$A_3$ substance and the mono-acetyl derivative of the SF-837-$A_4$ substance were also tested by the following manner. That is, an aqueous suspension of a bacteria Staphylococcus aureus Smith strain was intraperitoneally injected to ICR mice at a dosage of 100 times higher than its $LD_{50}$ value. Thirty minutes after this infection, the infected mice were then treated by an oral administration of an aqueous suspension containing the test active substance and a small amount of gum arabic 10 Mice were so treated in each group and fed for 7 days after the treatment. From the results of a series of the tests, it has then been estimated that these acetyl derivatives exhibit useful $CD_{50}$ values of 170 mg/kg, 180 mg/kg, 200 mg/kg and 200 mg/kg, respectively.

For therapeutic purposes, the free bases, the acid-addition salts and the acetyl derivatives of the SF-837, SF-837-$A_2$, SF-837-$A_3$ and SF-837-$A_4$ substances of the present invention may conventionally be formulated into tablet or capsule for oral administration and into aqueous solution or suspension for injection, with or without pharmaceutically acceptable additives such as carrier, vehicle, suspension agent and others. For the preparation of aqueous solution for injection, it is preferred to use the acid-addition salts such as tartarate because of their higher solubility in water. Furthermore, it may readily be understood that the free bases, the acid-addition salts and the acetyl derivatives of the SF-837, SF-837-$A_2$, SF-837-$A_3$ and SF-837-$A_4$ substances of the present invention may be used not only in their isolated form but also in the form of a mixture of two or more of them for therapeutic purposes.

According to a second aspect of the present invention, there is further provided a process for the production of the SF-837 substance, SF-837-$A_2$ substance, SF-837-$A_3$ substance and SF-837-$A_4$ substance, which comprises cultivating a strain of Streptomyces mycarofaciens in a culture medium containing assimilable nitrogen and carbon sources under aerobic conditions to produce and accumulate the SF-837 substance, SF-837-$A_2$ substance, SF-837-$A_3$ substance and SF-837-$A_4$ substance in the culture, and then recovering these antibiotics in mixture from the culture and then, if desired, separating these antibiotic substances from each other.

The micro-organism which produces the SF-837 substance, SF-837-$A_2$ substance, SF-837-$A_3$ substance and SF-837-$A_4$ substance at the same time when cultured was isolated firstly by the present inventors from a sample of soil and designated Streptomyces mycarofaciens nov. sp. which has been deposited unrestricted in the American Type Culture Collection, Washington D.C. under ATCC. number 21454.

Streptomyces mycarofaciens has the following microbiological characteristics:

(I) Morphological observation

1. Aerial mycelium: aerial mycelium produces open spiral abundantly on glycerine-Czapek's agar, glycerinecalcium-malate agar and starch synthetic agar etc.

2. Spore: spores ae of spherical shape, oval shape or elliptical shape, the surface structure is spiny (relatively thinner and longer spines), and the size of the spore is measuring 0.5–0.7 microns by 0.8–1.0 microns.

(II) Characteristics on different culture media are shown in Table 3 below.

TABLE 3

| Culture medium | Growth | Aerial mycelium | Soluble pigment |
|---|---|---|---|
| Secrose Czapek's agar | Poor growth, colorless to cream | Scant, cottony, whitish grey | None. |
| Glycerine Czapek's agar | Dark brown | White to cream, partly with formation of greyish colored and cottony aerial mycelium. | None or very much faint pink. |
| Krainsky's glucose asparagine agar | Light brown to reddish brown | White, with rose tinge | None or faint brownish yellow. |
| Ushinsky's glucose asparagine agar | Brown with reddish tinge | Rose to lavender | Light brown. |
| Calcium-malate agar | Poor growth, cream | None | None. |
| Glycerine calcium-malate agar | Light brown | Rose, gradually turning into greyish (cottony). | Do. |
| Starch synthetic agar | Dark brown with purple tinge | Rose, with highly reddish tinge, gradually turning into greyish (cottony). | Do. |
| Bouillon agar | Yellowish brown | Very much scant, white | None. |
| Glucose bouillon agar | Thick, good and brown to dark brown. | White to yellowish cream | Do. |
| Glucose peptone agar | Brown | Scant, white | Do. |
| Tyrosine agar | Reddish brown | White | Do. |
| Potato plug | Thick, good and brown to blackish brown. | Abundant, greyish brown | Blackish brown. |
| Carrot plug | Brown | White to cream | Brown in the periphery of the growth. |
| Skimmed milk | Ring shaped, surface growth, light brown. | Scant, white | None. |
| Egg | Pale brown | None | Do. |
| Loeffler coagulated serum | Pale brown | do | Do. |
| Glucose Czapek's solution | Surface and bottom growth, pale brown. | Scant, white | Do. |
| Gelatine (20° C.) | Cream to pale brown | None | None. |
| Bennett's | Brown to blackish brown | Rose, with reddish ringe | Lightly brown. |
| Cellulose medium | No growth | | |

NOTE: The incubation temperature was 28° C. in general, unless stated otherwise.

III. Physiological properties:
  Production of hydrogen sulfide : negative
  Production of tyrosinase : negative
  Production of nitrite : positive
  Coagulation of skimmed milk : positive
  Peptonization of skimmed milk : negative
  Hydrolysis of starch : positive
  Liquefaction of gelatine : positive(weak)
  Dissolution of Loeffler's coagulated serum : negative
  chromogenic action : negative IV. Utilization of carbon sources:
  1. Utilize: glucose, galactose, fructose, maltose, lactose, dextrin, starch, glycerine, inositol, mannose, salicin, sodium acetate, sodium citrate, sodium succinate.
  2. Doubtful: arabinose and rhamnose.
  3. Not utilize: xylose, saccharose, raffinose, dulcitol, sorbitol, mannitol and cellulose.

V. Growth temperature: 15° to 38°C.

The above-mentioned microbiological characteristics of the SF–837, SF–837–$A_2$, SF–837–$A_3$ and SF–837–$A_4$ substances-producing strain (hereinafter, merely called the SF–837 strain) may be summarised as follows: the conidiophore is spiral, the spore is spiny. On synthetic culture media, cream to brown to reddish brown colored growth is observed, and rose colored aerial mycelium and cottony, grey colored aerial mycelium are produced. No remarkable formation of soluble pigment is observed but formation of soluble pigment of light brown color may be observed on a restricted group of synthetic culture media. On organic culture media, on the other hand, brown colored growth is generally observed with formation of white to cream colored aerial mycelium but without production of soluble pigment. On potato plug, however, aerial mycelium of greyish brown color is formed abundantly and production of blackish colored soluble pigment is observed.

In view of Waksman's description (Wakasman's "The Actinomycetes" Vol. 2, 1961) it may be seen that the above-mentioned cultural characteristics of the SF–837 strain are partly close to those of fradiae series, ruber series and flavus series of the genus Streptomyces. Accordingly this point is considered in the following.

Firstly, in view of that the SF–837 strain is negative to melanin formation and shows the formation of aerial mycelium of rose color or tinge, the SF–837 strain is to be compared with the strains of fradiae series, namely Streptomyces fradiae, Streptomyces luridus, Streptomyces roseus and Streptomyces fuscus. However, the SF–837 strain is differentiated from the strains of fradiae series in that, with the SF–837 strain, the aerial mycelium of rose color or tinge appears temporarily in the initial stage of incubation and in many cases, changes into grey colored and cottony aerial mycelium in the middle and later stages of incubation, whereas the rose color or tinge observed for the strains of fradiae series is very much stable. Furthermore, the aerial mycelium of Streptomyces fradiae is straight and different from the spiral of the SF–837 strain. Moreover, Streptomyces fradiae is clearly different from the SF–837 strain in that Streptomyces fradiae shows abundant formation of aerial mycelium on sucrose Czapek's agar and colorless growth on starch agar.

The SF–837 strain is differentiated from Streptomyces fuscus and Streptomyces luridus in that Streptomyces fuscus does not show the formation of spiral and Streptomyces luridus shows the formation of spiral only on a restricted group of culture media whereas the SF–837 strain shows abundant formation of spiral on many culture media. Further Streptomyces roseus in common to the SF–837 strain in that the formation of spiral is observed but they may be differentiated clearly from each other in that Streptomyces roseus shows colorless growth on starch synthetic agar but does not show the formation of aerial mycelium on potato plug.

Scondly, in view of that the SF–837 strain is negative to melanin formation and shows a growth of red color or tinge, the SF–837 strain is to be compared with Streptomyces albosporeus, Streptomyces erythraeus, Streptomyces niveoruber and Streptomyces purpurascene, etc., which belong to the ruber series.

Streptomyces niveoruber is clearly distinct from the SF–837 strain in that the surface structure of spore of the former is smooth while that of the latter is spiny. Furthermore, Streptomyces albosporeus is differentiated from the SF–837 strain in that Streptomyces albosporeus forms aerial mycelia which are predominantly straight, shows distinctly red colored growth on sucrose-Czapek's agar and on glycerine-calcium malate agar but does not produce aerial mycelium on starch agar. Moreover, Streptomyces erythraeus does not agree with the SF–837 strain in that Streptomyces erythraeus shows red colored growth on sucrose-Czapek's agar and on potato plug and shows cream colored growth on glucose-asparagine agar and starch synthetic agar on which the SF–837 strain rather would show a growth with reddish tinge. Further Streptomyces purpurascens is common to the SF–837 strain in the spiny structure of the spore surface, but the former is differentiated from the latter in that the former produces markedly soluble pigment of red color or tinge on synthetic culture media while the latter is lack of such soluble pigment.

Comparison of the SF–387-strain is further made with Streptomyces microflavus and Streptomyces roseoflavus which belong to the flavus series but are deemed to be in a close relationship to the SF–837 strain. As viewed from the cultural characteristics of them, Streptomyces microflavus and Streptomyces roseoflavus are close to the SF–837 strain in some respects, but these two strains produce spore of which surface structure is smooth (H.D. Tresner' et al. "Journal of Bacteriology" Vol. 91, pages 199–2005, 1966), as be clearly different from the spiny structure of spore of the SF–837 strain.

In consequence, no strain which is coincident with the SF–837 strain can be found among the known species of the genus Streptomyces.

On the other hand, the new antibiotics SF–837, SF–837–A$_2$, SF–837–A$_3$ and SF–837–A$_4$ substances which are produced by the SF–837 strain are typical of the basic macrolide antibiotics. Among the new antibiotic substances of the present invention, the SF–837 and SF–837–A$_2$ substances exhibit an absorption maximum at a wave length of 232 m$\mu$ in the ultra-violet spectrum, and in view of this, these two substances may be assumed to be antibiotics of the same series as leucomycin, josamycin, spiramycin, miamycin and tertiomycin. Moreover, the SF–837–A$_3$ and SF–837–A$_4$ substances show a high absorption maximum in the vicinity of a wave length of 280 m$\mu$ in the ultra-violet spectrum, and in view of this, these two substances may be assumed to be antibiotics of the same series as niddamycin, carbomycin B, tylosin, relomycin, and macrocin. Therefore, the microbiological properties of the SF–837 strain are now compared to those of the microorganisms which produce the above-mentioned known antibiotics.

It may readily be understood that the SF–837 strain is different from the leucomycin-producing microorganism Streptomyces kitastoensis; the josamycin-producing micro-organism Streptomyces narbonensis var. josamyceticus; the spiramycin-producing micro-organism Streptomyces ambofaciens; miamycin-producing micro-organism Streptomyces ambofaciens; the tertiomycin-producing micro-organism Streptomyces eurocidicus, Streptomyces albireticuli; the carbomycin B-producing micro-organism Streptomyces halstedii; the tylosin-and macrocin-producing micro-organism Streptomyces fradiae and the relomycin-producing micro-organism Streptomyces hygroscopicus, since clear differences appear between the morphological characteristics of the SF–837 strain and those of the known microorganisms, as tabulated in Table 4 below.

TABLE 4

| Antibiotics produced | Micro-organisms | Aerial mycelium | Surface structure of spore |
|---|---|---|---|
| SF–837 SF–837–A$_2$ SF–837–A$_3$ SF–837–A$_4$ | SF–837 strain | Spiral | Spiny |
| Leucomycin | Streptomyces kitasatoenis | Whorl | Smooth |
| Josamycin | Streptomyces narboensis var. josamyceticus | Straight | Smooth |
| Spiramycin | Streptomyces ambofaciens | Spiral | Smooth |
| Miamycin | Streptomyces ambofaciens | Spiral | Smooth |
| Tertiomycin | Streptomyces eurocidicus | Whorl | Smooth |
| Tertiomycin | Streptomyces albireticuli | Whorl | Smooth |
| Carbomycin B | Streptomyces halstedii | Spiral | Smooth |
| Tylosin | Streptomyces fradiae | Straight | Smooth |
| Macrocin | Streptomyces fradiae | Straight | Smooth |
| Relomycin | Streptomycin hydroscopicus | Spiral | Smooth |

The SF–837 strain is also clearly differentiated from the niddamycin-producing micro-organism Streptomyces djakartensis (which is refered to in the specification of German Pat. No. 1,077,381) of which the spore surface structure is not described, in that Streptomyces djakartensis is positive to melanin formation but does neither peptonize nor coagulate skimmed milk.

As a result of the above-mentioned microbiological comparison and consideration, we have confirmed not only that the SF–837 strain is new as one of the microorganisms which produce the basic macrolide antibiotics, but also that the SF–837 strain is different from all the known strains even from the view-point of taxonomy of whole actinomycetes. Thus, we have designated this SF–837 strain as Streptomyces mycarofaciens nov. sp.

The SF–837 strain has properties which are liable to vary as may normally be observed with the other Streptomyces. Thus, for example, the SF–837 strain may produce variants and mutants when it is treated with various known mutagens such as ultraviolet rays. X-rays, high frequency electromagnetic waves, radioactive rays and chemicals, etc. All natural and artificial variants and mutants of the SF–837 strain may be used in the process of the present invention, as long as they have the ability to produce any of the SF–837, SF–837–A$_2$, SF–837–A$_3$ and SF–837–A$_4$ substances of the present invention.

According to the process of the present invention, the SF–837 strain or its variant or mutant may be cultivated in a known manner in a culture medium containing the nutrients which may be utilised by usual micro-organisms. As the nutrient sources, any of the known nutrients which have usually been used in cultivation of Streptomyces may be employed. For example, glucose, starch, glycerine, dextrin, sucrose, saccharified starch, molasses and the like are useful as the carbon source. Soybean meal, wheat-embryo, meat-extract, peptone, corn steep liquor, soluble vegetable protein, dried yeast, ammonium sulfate, sodium nitrate and the like may be used as the nitrogen source. If necessary, inorganic salts such as calcium carbonate, sodium chloride, potassium chloride, phosphates and the like may be added to the culture medium. In addition, such organic and inorganic materials which aid the growth of the SF–837 strain and promote the production of at least one of the SF–837, SF–837–$A_2$, SF–837–$A_3$ and SF–837–$A_4$ substances.

As the method for cultivation of the SF–837 strain, liquid cultivation and, in particular, liquid cultivation under submerged aerobic conditions is most preferable similarly to the general processes for the production of the known antibiotics. The cultivation may be effected under aerobic conditions and suitable fermentation temperature is in a range of 20°C. to 30°C. For the commercial or laboratory production of the SF–837, SF–837–$A_2$, SF–837–$A_3$ and SF–837–$A_4$ substances, however, it is often preferred to carry out the cultivation at a temperature in the vicinity of 28°C. In these circumstances, the concentrations of the SF–837, SF–837–$A_2$, SF–837–$A_3$ and SF–837–$A_4$ substances in the culture broth reach a maximum at the end of 2 to 5 days of fermentation, either in shake-cultivation method or in tank-cultivation method.

The SF–837 substance is the main metabolic product of Streptomyces mycarofaciens, and the SF–837–$A_2$, SF–837–$A_3$ and SF–837–$A_4$ substances are normally produced totally at minor proportions in a range of about 5 to 20 percent by weight of the SF–837 substance produced.

The SF–837, SF–837–$A_2$, SF–837–$A_3$ and SF–837–$A_4$ substances of the present invention may be produced at the same time by the cultivation of the SF–837 strain and have similar physico-chemical properties as stated hereinbefore, and they may be recovered from the culture, purified and isolated generally by utilising any of the known methods which are usually available for the recovery, purification and isolation of known, basic antibiotics.

The recovery of the SF–837, SF–837–$A_2$, SF–837–$A_3$ and SF–837–$A_4$ substances of the present invention from the culture may be performed in various ways.

Thus, the SF–837, SF–837–$A_2$, SF–837–$A_3$ and SF–837–$A_4$ substances as produced from the cultivation of the SF–837 strain are present in the solid phase containing mycelium cake as well as in the liquid phase of the culture. The culture may be filtered in a known manner to give the filter cake (that is, the solid phase containing mycelium cake) and the filtrate (that is, the liquid phase of the fermentation broth) separately. The active substances present in the filtrate may be extracted with an appropriate water-immiscible organic solvent such as ethyl acetate, butyl acetate, chloroform, benzene, ethyl ether, methyl isobutyl ketone and butanol etc., under neutral or weakly alkaline conditions. The active substances present in the filter cake may also be extracted with acidified water, or with an appropriate water-miscible organic solvent such as methanol, ethanol and acetone etc. Alternatively, the culture may directly be extracted with a water-immiscible organic solvent without preliminary filtration of mycelium cake, so that the active substances may immediately transferred from the culture into the organic solvent used.

The active substances which have been transferred in solution into the organic solvent may then be reextracted with acidified water. The resulting extract in acidified water may subsequently be made neutral or weakly alkaline in nature by addition of basic substances such as sodium hydroxide, potassium hydroxide, sodium carbonate or sodium bicarbonate and then shaken together with an appropriate organic solvent, so that the active substances are again transferred into the organic solvent phase. By repeating these operations of reversal extraction, the impurities may be removed from the active substances to some extent. The extract in the organic solvent may be concentrated to dryness under reduced pressure, so that a crude powder containing the SF–837, SF–837–$A_2$, SF–837–$A_3$ and SF–837–$A_4$ substances may be recovered. Alternatively the solution of the active substances in acidified water may either be freeze-dried as such to give the acid-addition salts of the active substances, or the aqueous solution may be rendered neutral or weakly alkaline by addition of a suitable basic material to precipitate the active substances in the form of the free base.

The SF–837, SF–837–$A_2$, SF–837–$A_3$ and SF–837–$A_4$ substances are basic in nature as mentioned above, and therefore the culture or its filtrate or solution of the active substances may also be treated with ion-exchanger such as ion-exchange resin for example, Amberlite IRC–50 etc., and ion-exchange cellulose, so that the active substances are adsorbed by the ion-exchanger, which may subsequently be eluted out using a suitable solvent.

The resulting crude powder containing the mixed active substances so recovered may further be purified by extracting with a suitable organic solvent such as benzene which can dissolve the SF–837, SF–837–$A_2$, SF–837–$A_3$ and SF–837–$A_4$ substances therein to further remove the remaining impurities, by washing with a suitable organic solvent such as petroleum ether, ligroin and n-hexane which hardly can dissolve the SF–837, SF–837–$A_2$, SF–837–$A_3$ and SF–837–$A_4$ substances but can well dissolve the impurities, and/or by adding petroleum ether, ligroin or n-hexane to a solution of the active substances in an organic solvent such as benzene.

In this way, a purified mixture of the SF–837 substance with the SF–837–$A_2$, SF–837–$A_3$ and SF–837–$A_4$ substances may be obtained in which the total proportion of the SF–837–$A_2$, SF–837–$A_3$ and SF–837–$A_4$ substances varies normally in a range of about 5 to 20 percent by weight of the content of the SF–837 substance depending on the fermentation conditions, the manner of recovery, the methods of purification employed and other various factors. This purified mixture is as such ready for formulation and administration for therapeutic purposes without isolating each component substance therefrom.

If desired, the purified mixture of the SF–837 substance with minor proportion of the SF–837–$A_2$, SF–837–$A_3$ and SF–837–$A_4$ substances may directly be converted into a mixture of their acid-addition salts by dissolving the mixture of the free bases in an organic solvent such as ethyl ether, treating the solution with a solution of an organic or inorganic acid such as hydrochloric acid, sulfuric acid, tartaric acid, citric acid dissolved in a suitable organic solvent such as ethyl ether and thereby precipitating in the form of a mixture of the acid-addition salts which may be filtered and dried and then be ready as such for formulation and administration for therapeutic purposes. The purified mixture of the free bases may also be converted into a mixture of the aforesaid acetyl derivatives in a conventional manner of acetylation, e.g., by dissolving in pyridine, treating the solution with acetic anhydride at room temperature or at a slightly elevated temperature for a sufficient time to give the diacetyl derivatives of the SF-837 and SF-837-$A_2$ substances and the monoacetyl derivatives of the SF-837-$A_3$ and SF-837-$A_4$ substances and depositing the acetylation products by addition of ice water to the reaction mixture. The mixture of the acetylated derivatives may be subsequently filtered and washed with water to be free from the impurities, and then this mixture as such is ready for formulation and administration for therapeutic purposes.

In order to effect the separation of the SF-837, SF-837-$A_2$, SF-837-$A_3$ and SF-837-$A_4$ substances from each other, it is effective to employ chromatographic methods using a suitable adsorbent such as activated alumina or silica gel and the like and a suitable developing solvents, as well as various types of counter current distribution methods, either alone or in combination. In the purified mixture of the free bases of the SF-837, SF-837-$A_2$, SF-837-$A_3$ and SF-837-$A_4$ substances which has been obtained from the above-mentioned procedures of recovery and purification, the SF-837-$A_2$, SF-837-$A_3$ and SF-837-$A_4$ substances are normally present as the minor components and at a smaller proportion than the SF-837 substance. Accordingly for the isolation of the components it may be efficient that said purified mixture of the free bases is firstly subjected to a counter-current distribution method so as to separate a fraction rich in the SF-837 substance from a fraction rich in a mixture of the SF-837-$A_2$, SF-837-$A_3$ and SF-837-$A_4$ substances and that these two fractions are then separately subjected to chromatography with silica gel or alumina so as to effect a complete isolation of the component substances from each other.

In general, the separation of the SF-837, SF-837-$A_2$, SF-837-$A_3$ and SF-837-$A_4$ substances may conveniently be conducted, for example, by subjecting a solution in a suitable organic solvent of the above mentioned crude powder containing the mixed active substances recovered to chromatography in a column of activated alumina or silica gel using a mixture of ethyl acetate-benzene (1:1) or benzene-acetone (4:1) as the developing solvent and, if necessary, repeating the chromatographic procedures several times. Usually the active substances may successively eluted out of the alumina column in the sequence of the SF-837-$A_4$ substance, SF-837-$A_3$ substance, SF-837-$A_2$ substance and finally the SF-837 substance when developed with ethyl acetate-benzene (1:1). A minor portion of each of the fractions of the eluate is co-currently tested or assayed by alumina thin layer chromatography. Fractions which is then observed to give a single spot characteristic to one of the active substances in this alumina thin layer chromatography and hence which may be confirmed to contain only one of the active substances are combined together and then concentrated to dryness under reduced pressure, and these procedures are repeated with each of the fractions containing the SF-837 substance alone, the fractions containing the SF-837-$A_2$ substance alone, the fractions containing the SF-837-$A_3$ substance alone and the fractions containing the SF-837-$A_4$ substance alone. In this way, the pure free bases of the SF-837, SF-837-$A_2$, SF-837-$A_3$ and SF-837-$A_4$ substances may be separated from each other in the form of white colored powder, respectively.

For the purification and separation of the SF-837, SF-837-$A_2$, SF-837-$A_3$ and SF-837-$A_4$ substances, it may be added that any of the known methods which have been used for the purification and separation of marcrolide antibiotics may be applied to for that purpose, as they are also members of the macrolide antibiotics. However, we prefer it to carry out the production, recovery or isolation purification and separation of the SF-837, SF-837-$A_2$, SF-837-$A_3$ and SF-837-$A_4$ substances from the culture of the SF-837 strain and from each other by the following steps which comprises culturing the SF-837 strain at a temperature of 20-30°C. in a deep-aerated liquid medium containing the known assimilable nitrogen and carbon sources until a significant antibacterial activity is given to the culture broth, filtering the culture, extracting the culture filtrate at a pH of 7 - 9 with a water-immiscible organic solvent for the SF-837, SF-837-$A_2$, SF-837-$A_3$ and SF-837-$A_4$ substances, such as ethyl acetate, butyl acetate, chloroform, ethyl ether, methyl isobutyl ketone and butanol, then re-extracting the resultant organic extract containing the active substances with dilute aqueous acid (at pH 2 - 3), such as aqueous hydrochloric acid, aqueous sulfuric acid and the like, making the resulting aqueous extract alkaline (preferably to pH 7 - 9) by addition of alkali, again extracting the aqueous extract with one of the water-immiscible organic solvent to transfer the active substances into the latter organic solvent, repeating at least one time this transfer of the active substances from an organic extract in an amount of a water-immiscible organic solvent into dilute aqueous acid and then into another amount of the water-immiscible organic solvent, concentrating the finally resulting organic solution of the active substances so partly purified to dryness in vacuo, dissolving the resultant crude powder of the mixed active substances in ethyl acetate or butyl acetate, passing the solution through a column of activated carbon, developing with ethyl acetate or butyl acetate, collecting the active fractions of the eluate, concentrating the active fractions to a smaller volume, extracting the concentrate with aqueous diluted hydrochloric acid, making the aqueous extract alkaline by addition of an alkali, separting the formed precipitate substantially made of the mixed active substances, dissolving the precipitate in benzene, subjecting the benzene solution to chromatography with a silica gel column and using a mixture of benzene-acetone as the developing solvent, collecting the eluate in fractions, testing each of the fractions by alumina thin layer chromatography, combining together and concentrating the dryness in vacuo only the fractions which give a single spot characteristic to the SF-837-$A_4$ substance in this alumina thin layer chromatography, whereby the free base of the SF-837-$A_4$ substance is yielded in the form of pure powder, combining together and concentrating to dryness in vacuo only the fractions which give a single spot characteristic to the SF-837 substance in the alumina thin layer chromatography, whereby the free base of the SF-837 substance is yielded in the form of pure powder, combining together and concentrating to dryness in vacuo the fractions which are eluted from said silica gel column after the above-mentiond fractions giving the single characteristic spot of the SF–837–A$_4$ substance but before the above-mentioned fractions giving the single characteristic spot of the SF–837 substance and which contain in solution both the SF–837–A$_2$ and SF–837–A$_3$ substances together with a minor proportion of the SF–837 substance, whereby a powder of a mixture of the SF–837–A$_2$ and SF–837–A$_3$ substances together with a minor proportion of the SF– 837 substance is obtained, dissolving this powder in benzene, subjecting the resultant solution of said powder in benzene to chromatography in a column of activated alumina and using a mixture of ethyl acetate-benzene and then a mixture of ethyl acetate-acetone as the developing solvent, collecting the eluate therefrom in fractions, testing each of these fractions by an alumina thin layer chromatography, combining together and concentrating to dryness in vacuo only the fractions which give a single spot characteristic to the SF–837–A$_3$ substance in the just above-mentioned alumina thin layer chromatography, whereby the free base of the SF–837–A$_3$ substance is yielded in the form of pure powder, also combining together and concentrating to dryness in vacuo the remaining fractions of the eluate from the above-mentioned activated alumina column to give a powder mainly containing the SF–837–A$_2$ substance, again dissolving this powder in benzene, then subjecting this benzene solution again to chromatography in column of activated alumina and using a mixture of ethyl acetate-benzene as the developing solvent, collecting the eluate therefrom in fractions, testing each of the fractions by alumina thin layer chromatography, combining together and concentrating to dryness in vacuo only the fractions which give a single spot characteristic to the SF–837–A$_2$ substance in the just above alumina thin layer chromatography, whereby the free base of the SF–837–A$_2$ substance is yielded in the form of pure powder.

The SF–837, SF–837–A$_2$, SF–837–A$_3$ and SF–837–A$_4$ substances which have been separated from each other in the pure state as mentioned above each may subsequently be converted into the acid-addition salt or into the aforesaid acetyl derivative, if desired. The conversion into the acid-addition salt may be effected, e.g., by dissolving the free base in a suitable organic solvent such as ethyl ether etc., and then adding thereto a saturated solution of a suitable organic acid or inorganic acid such as tartaric acid, citric acid, acetic acid, hydrochloric acid, sulfuric acid and the like dissolved in ethyl ether. The conversion into the diacetyl derivatives of the SF–837 and SF–837–A$_2$ substances or the mono-acetyl derivatives of the SF–837–A$_3$ and SF–837–A$_4$ substances may be carried out, for example, by dissolving the free base in pyridine and then treating the solution with a large excess of acetic anhydride in the same way as mentioned hereinbefore.

As mentioned in the above, the SF–837, SF–837–A$_2$, SF–837–A$_3$ and SF–837–A$_4$ substances of the present invention belong to the class of macrolide antibiotics. The SF–837 and SF–837–A$_2$ substances exhibit an absorption maximum at a wave length of 232 m$\mu$ in the ultra-violet region of spectrum and therefore are to be compared with some of the known macrolide antibiotics, namely spiramycin group (I, II and III), leucomycin group (A$_1$ to A$_9$ and B$_1$ to B$_4$), josamycin, tertiomycin (A and B) and miamycin. The differences of the SF–837 substance and SF–837–A$_2$ substance from these known macrolide antibiotics are elucidated below.

Firstly, spiramycin is distinguishable from the SF–837 and SF–837–A$_2$ substances of the present invention in view of the differences in their Rf-values in silica gel thin layer chromatography which are mentioned in Table 5 below and also judging from the comparison of values of optical rotations and pKa' values of spiramycin which are mentioned on pages 304 – 317 of the "Helvetica Chimica Acta" Vol. 39, as spiramycin I shows $[\alpha]_D$ –96° and pKa' of 7.7; spiramycin II shows $[\alpha]_D$ –80° and pKa' of 7.6; and spiramycin III shows $[\alpha]_D$ –79° and pKa' of 7.6.

TABLE 5

| Antibiotics | Rf-value Developing solvent consisting of n-butanol: acetic acid:water(3:1:1) |
|---|---|
| SF-837 substance | 0.67 |
| SF-837-A$_2$ substance | 0.68 |
| Spiramycin I | 0.11 |
| Spiramycin II | 0.13 |
| Spiramycin III | 0.19 |
| Tertiomycin A | 0.78 |
| Tertiomycin B | 0.76 |

Secondly, miamycin, leucomycin B group (B$_1$, B$_2$, B$_3$ and B$_4$) and leucomycin A$_2$ are distinguished from the SF–837 and SF–837–A$_2$ substances of the present invention in that miamycin has a value of null for optical rotation (the "Antibiotics and Chemotherapy" pages 37 – 39 (1957)), in that leucomycin B$_1$, B$_2$, B$_3$ and B$_4$ have a melting point of 214° – 215°C., 214° – 216°C., 216° – 217°C. and 221° – 223°C., respectively (the gazette of Japanese Patent Publication No. Sho-3-5-18750) and in that leucomycin A$_2$ has a value of $E_{1cm}^{1\%}$ 158 for the absorption maximum in the ultra-violet region of spectrum and a molecular weight of 1,220 to 1,250 (the gazette of Japanese Patent Publication No. Sho-35-18750).

Thirdly, tertiomycin A and B are differentiated clearly from the SF–837 and SF–837–A$_2$ substances of the present invention in view of the differences in their melting points, their optical rotation and their Rf-values in silica gel thin layer chromatography as tabulated in Table 5 and Table 6. Tertiomycin A has a melting point of 202° – 204°C. and a degree of optical rotation of $[\alpha]_D$ –44° (the "Journal of Anti-biotics" pages 105 – 109 (1955)) and tertiomycin B has a melting point of 97° – 99°C. and a degree of optical rotation of $[\alpha]_D$ –55° (the "Journal of Antibiotics" pages 161 – 163 (1955)).

Fourthly, leucomycin A$_1$, A$_3$, A$_4$, A$_5$, A$_6$, A$_7$, A$_8$ and A$_9$ and josamycin may be differentiated from the SF–837 and SF–837–A$_2$ substances by comparing directly their Rf-values in alumina thin layer chromatography (using ethyl acetate as development solvent) as shown in Table 6 below, and in view of the known properties of leucomycin A$_1$ as disclosed in the gazette of Japanese Patent Publication No. Sho-36-98, and further considering that leucomycin A$_3$ has a melting point of 120° – 121°C. and a degree of optical rotation of $[\alpha]_D$ –55.4 (the "Antimicrobial agents and Chemotherapy" pages 631 – 636 (1967)), the known properties of leucomycin A$_4$, A$_5$, A$_6$, A$_7$, A$_8$ and A$_9$ as reported in the "Journal of Antibiotics" pages 272 – 278 (1968)

and that josamycin has a melting point of 130° – 133°C. and a degree of optical rotation of $[\alpha]_D$ −70°C. (the gazette of Japanese Patent Publication No. Sho–41–21759).

TABLE 6

| Antibiotics | Rf-values |
|---|---|
| SF-837 substance | 0.78 |
| SF-837-A₂ substance | 0.84 |
| Josamycin | 0.65 |
| Leucomycin A₁ | 0.08 |
| Leucomycin A₅ | 0.05 |
| Leucomycin A₇ | 0.01 |
| Leucomycin A₉ | 0.02 |
| Leucomycin A₃ | 0.65 |
| Leucomycin A₄ | 0.60 |
| Leucomycin A₆ | 0.57 |
| Leucomycin A₈ | 0.53 |
| Tertiomycin A | 0.61 |
| Tertiomycin B | 0.64 |

Figure 4:
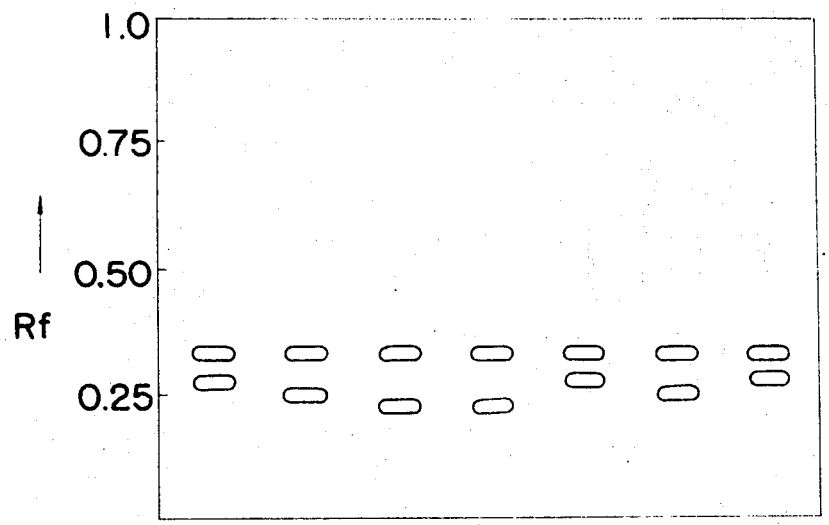
FIG. 4 shows alumina thin layer chromatograms of the SF-837 and its related antibiotics.
Figure 5:
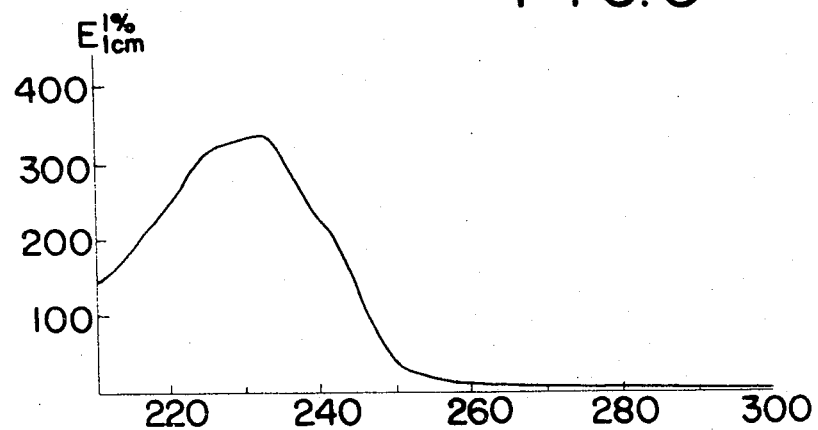
FIG. 5 shows a curve of the ultra-violet absorption spectrum of the SF-837-A₂ substance in the form of the free base dissolved in ethanol.
Figure 6:
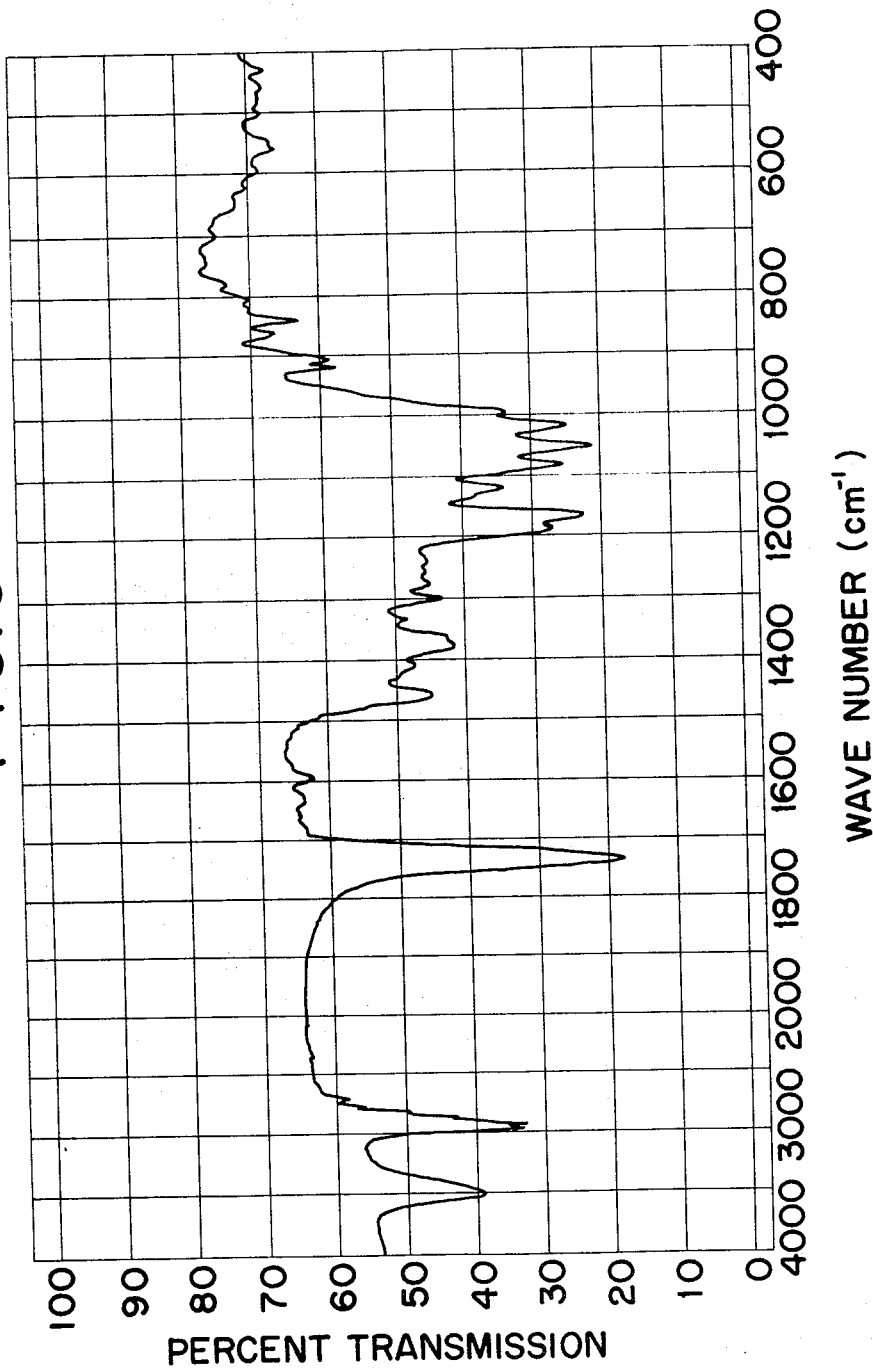
FIG. 6 shows a curve of the infra-red absorption spectrum of the SF-837-A₂ substance free base pelleted in potassium bromide.
Figure 7:
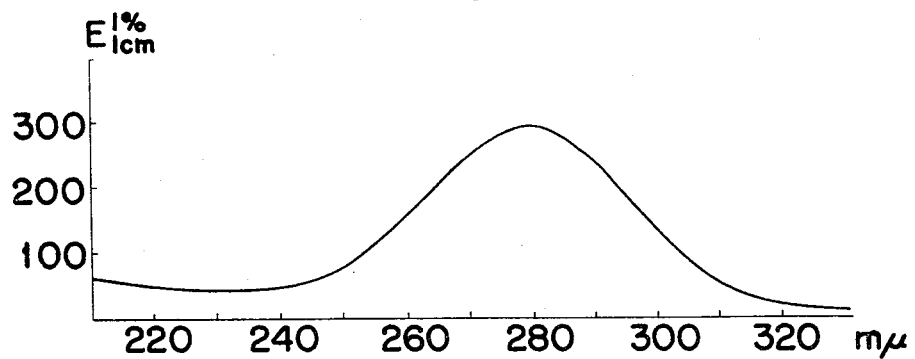
FIG. 7 shows a curve of the ultra-violet absorption spectrum of the SF-837-A₃ substance in the form of the free base dissolved in ethanol.
Figure 9:
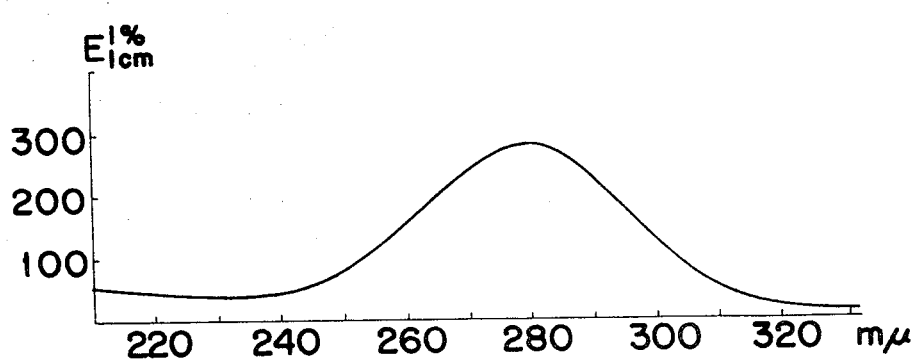
FIG. 9 shows a curve of the ultra-violet absorption spectrum of the SF-837-A₄ substance in the form of the free base dissolved in ethanol.
Figure 8:
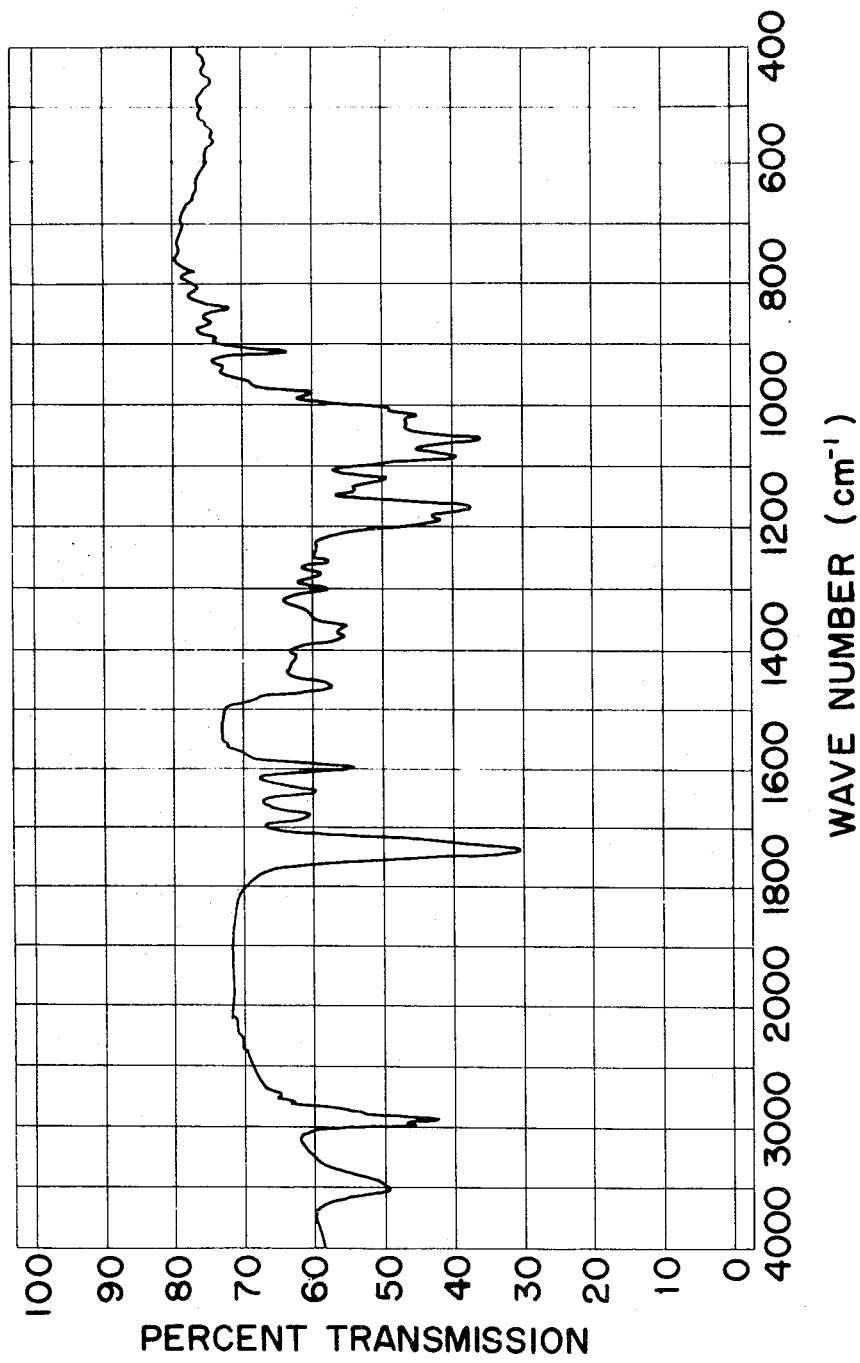
FIG. 8 shows a curve of the infra-red absorption spectrum of the SF-837-A₃ substance free base pelleted in potassium bromide.
Figure 10:
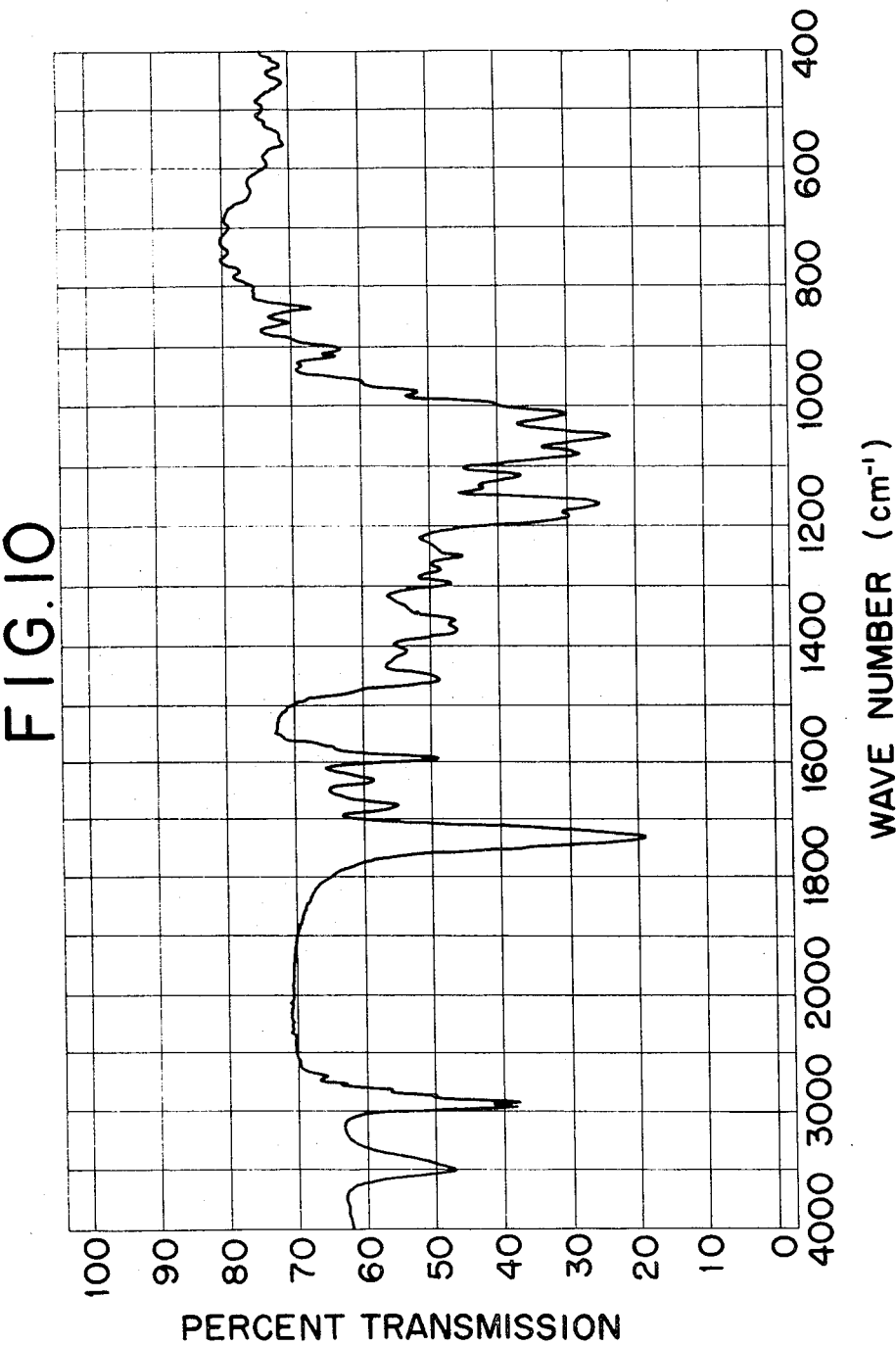
FIG. 10 shows a curve of the infra-red absorption spectrum of the SF-837-A₄ substance free base pelleted in potassium bromide.

The difference of the SF-837 substance of the present invention from the above-mentioned known antibiotics can be made much more obvious by observing alumina thin layer chromatograms as shown in FIG. 4 of the attached drwings. The chromatograms of FIG. 4 were prepared by spoting a solution of the SF-837 substance and leucommycin A₃, a solution of the SF-837 substance and leucomycin A₄, a solution of the SF-837 substance and leucomycin A₆, a solution of the SF-837 substance and leucomycin A₈, a solution of the SF-837 substance and josamycin, a solution of the SF-837 substance and tertiomycin A and a solution of the SF-837 substance and tertiomycin B, respectively, on and along the same level of a thin layer plate of alumina, then subjecting to ascending chromatography using ethyl acetate-benzene (2:1) as the developing solvent, and finally coloring the resulting spots by treatment with 10 percent sulfuric acid at 80°C for 5 minutes.

Figure 3:
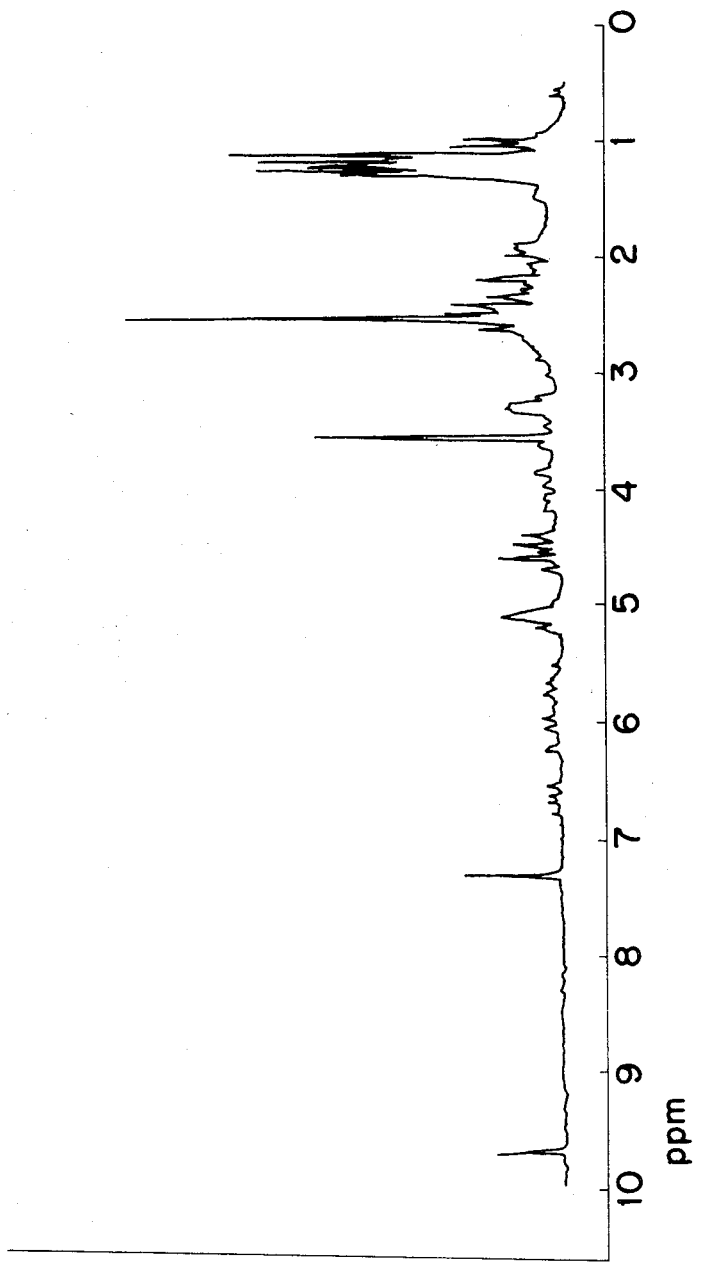
FIG. 3 shows a curve of the nuclear magnetic resonance spectrum (100 Mc.) of the SF-837 substance free base dissolved at a concentration of 10 percent in dente-chloroform.

Moreover, leucomycin A₃, A₄, A₆ and A₈ show a sharp absorption band (attributable to O-acetyl group) at 2.22 ppm (100 Mc) in the curve of nuclear magnetic resonance spectrum [the "Journal of Antibiotics" pages 272-278, (1968)], and josamycin also shows a sharp absorption band (attributable to O-acetyl group) at 2.17 ppm (60 Mc) in the curve of nuclear magnetic resonance spectrum [the "Journal of Antibiotics" pages 174-180, (1957)]. This signal cannot be observed in a curve of the nuclear magnetic resonance spectrum of the SF-837 substance of the present invention as shown in FIG. 3 of the attached drawing.

From the foregoing explanation it is clear that the SF-837 and SF-837-A₂ substances of the present invention do not coincide with any of the known antibiotics and should be new substances.

The SF-837-A₃ and SF-837-A₄ substances of the present invention exhibit an absorption maximum at a wave length of 280 mμ in the ultra-violet region of spectrum as be different from the SF-837 and SF-837-A₂ substances of the present invention which exhibit an absorption maximum at a wave length of 232 mμ in the ultra-violet region of spectrum. In view of the above-mentioned physico-chemical properties of the SF-837-A₃ and SF-837-A₄ substances, however, it is clear that these two substances are similarly ones of the macrolide antibiotics.

Among the known group of macrolide antibiotics, carbomycin B, niddamycin, tylosin, relomycin and macrocin are to be compared with the SF-837-A₃ and SF-837-A₄ substances of the present invention in view of the fact that these known antibiotic substances also exhibit a remarkable absorption at a wave length of approximately 280 mμ in the ultra-violet region of spectrum. For comparison, the physico-chemical properties of these antibiotic substances are tabulated in Table 7 below.

TABLE 7

| Antibiotics | Melting point. °C. | Absorption maximum in ultra-violet absorption spectra at | Molecular formula | Molecular weight | Optical rotations (degree) |
|---|---|---|---|---|---|
| Carbomycin B | 141-144 | 278 mμ (E₁ cm.¹% 276) | C₄₂H₆₇O₁₅N | 825 | −35 |
| Niddamycin | 132-134 | 279 mμ (E₁ cm.¹% 275) | C₄₀H₆₅O₁₄N | 783 | −43 |
| Tylosin | 128-132 | 284 mμ (E₁ cm.¹% 245) | C₄₅H₇₇O₁₇N | 907 | −46 |
| Relomycin | 172-175 | 282 mμ (E₁ cm.¹% 245) | C₄₅H₇₉O₁₇N | 909 | −44 |
| Macrocin | 134-136 | 283 mμ (E₁ cm.¹% 244) | C₄₆H₇₉O₁₇N | 921 | −52.5 |

NOTE: The data as given in Table 7 are based on "Index of Antibiotics from Actinomycetes" by Umezawa et al. published in 1967.

Firstly, tylosin, relomycin and macrocin are clearly differentiated from the SF-837-A₃ and SF-837-A₄ substances of the present invention in view of their molecular formulae and molecular weights and in the case of tylosin, of Rf value in Table 8 below.

Secondly, carbomycin B and niddamycin can hardly be differentiated from the SF-837-A₃ and SF-837-A₄ substances as generally viewed from their physico-chemical properties, but they are obviously distinguishable from each other in account of the difference in their Rf values in alumina and silica gel thin layer chromatographies as shown in Table 8 below.

TABLE 8

| Antibiotics | Rf-values Alumina thin layer chromatography developed with ethyl acetate-benzene (2:1) | Silica gel thin layer chromatography developed with benzeneacetone (2:1) |
|---|---|---|
| SF-837-A₃ substance | 0.45 | 0.50 |
| SF-837-A₄ substanace | 0.52 | 0.55 |
| Carbomycin B | 0.46 | 0.56 |
| Niddamycin | 0.05 | 0.42 |
| Tylosin | 0.02 | 0.18 |

When hydrolysed with alkali, one molecule of the SF-837-A₃ substance gives two molecules of propionic acid, and one molecule of the SF-837-A₄ substance gives one molecule of propionic acid and one molecule of n-butyric acid, while one molecule of carbomycin B gives acetic acid and iso-valeric acid (the "Angewandte Chemie" pages 50-58, 1957), and one molecule of niddamycin gives one molecule of iso-valeric acid (the "Arzneimittel Forschung" Vol. 12, 1191-5, 1962). Accordingly it is much more apparent that the SF-837-A₃ and SF-837-A₄ substances of the present invention are different from carbomycin B and niddamycin.

In view of that any ester linkage other than the lactone linkage does not occur in tylosin (the "Tetrahedron Letters" pages 2339–2345, 1964) as well as in relomycin which is the reduced derivative of tylocin (the "Antimicrobial agent and Chemotherapy" pages 45–48, 1963), tylosin and relomycin are distinguishable from the SF–837–A$_3$ and SF–837–A$_4$ substances.

From the foregoing explanation, it is clear that the SF–837 and SF–837–A$_2$ substances as well as the SF–837–A$_3$ and SF–837–A$_4$ substances of the present invention may be recognized as new antibiotic substances which do not coincide with any of the known macrolide antibiotics.

The present invention is now illustrated but in no way limited by the following Examples.

EXAMPLE 1

The SF–837 strain, namely Streptomyces mycarofaciens identified as ATCC No. 21454 was inoculated to 60 l. of a liquid culture medium containing 2.5 percent saccharified starch, 4 percent soluble vegetable protein, 0.3 percent potassium chloride and 0.3 percent calcium carbonate at pH 7.0, and then stirr-cultured in a jar-fermenter at 28°C. for 35 hours under aeration. The resulting culture was filtered directly and the filter cake comprising the mycelium cake was washed with dilute hydrochloric acid.

The culture filtrate combined with the washing liquid was obtained at a total volume of 50 l. (potency 150 mcg/ml.). The filtrate (pH 8) was then extracted with 25 l. of ethyl acetate and 22 l. of the ethyl acetate phase was concentrated to approximately 3 l. under reduced pressure. The concentrated was diluted with 1.5 l. of water, adjusted to pH 2.0 by addition of 5N hydrochloric acid and then shaken thoroughly. The aqueous phase was separated from the organic phase and this aqueous solution was adjusted to pH 8 by addition of 3N sodium hydroxide and then extracted with 800 ml. of ethyl acetate. The resulting ethyl acetate extract was then shaken similarly together with 500 ml. of aqueous hydrochloric acid to transfer the active substances into the latter which was again extracted with 400 ml. of ethyl ether at pH 8. The ether extract was dried with anhydrous sodium sulfate and concentrated under reduced pressure to give 16.5g. of light yellow colored powder.

12 Grams of this crude powder were dissolved in 200 ml. of ethyl acetate and the solution was passed through a column of 600 ml. of pulverised carbon which had been impregnated with ethyl acetate. The development was carried out using ethyl acetate as the solvent and the active fractions of eluate were collected to a total volume of 2,500 ml., which was then evaporated to dryness under reduced pressure to yield 5 g. of a white colored powder. This powder was dissolved in 10 ml. of benzene and the insoluble matters were filtered out. The filtered solution in benzene was then subjected to chromatographic isolation by passing through a column of 700 ml. of silica gel which had been impregnated with benzene. The development of the active substances adsorbed on the silica gel was effected using a solvent system consisting of benzene-acetone (4:1), and the eluate was collected in fractions of each 20 ml. The active fractions Nos. 90 to 380 which gave a single spot in alumina thin layer chromatography and which could be recognized as containing the SF–837 substance purely in view of the Rf-value of the single spot were combined together to a total volume of 4,000 ml., and then concentrated under reduced pressure to yield 1.5 g. of white colored powder of a melting point of 122° – 124°C. which was found by analysis to be the pure SF–837 substance free base.

EXAMPLE 2

20 Litres of a culture medium comprising 3 percent glucose, 1 percent peptone, 0.5 percent meat extract, 0.2 percent sodium chloride, 0.3 percent calcium carbonate and 0.3 percent soybean oil (adjusted to pH 7) were placed in a jar-fermenter having a capacity of 30 l., and then sterilized by heating at 120°C. for 20 minutes. Thereafter the SF–837 strain, namely Streptomyces mycarofaciens was inoculated to the culture medium and stirr-cultured at 28°C. for 48 hours under aeration. The fermented broth was filtered at pH 6 to give 18 l. of the culture filtrate (potency, 200 mcg/ml.). The filtrate was adjusted to pH 7.5 by addition of 3N sodium hydroxide and then extracted with 8 l. of butyl acetate. The butyl acetate extract was subsequently processed similarly to Example 1 and finally subjected to chromatographic isolation with silica gel column in the same manner as in Example 1. A white colored powder having a melting point of 122° – 124°C. and consisting of the pure SF–837 substance was obtained at a yield of 800 mg.

EXAMPLE 3

4.0 Grams of the crude, yellow colored powder which was recovered from the concentration of the ether extract in Example 1 was suspended in 1,000 ml. of water and the aqueous suspension was adjusted to pH 3.5 by addition of 5 N hydrochloric acid. The solution was then passed through a column of 100 ml. of Amberlite CG–50 (H type) to effect the adsorption of the active substances. The ion-exchange resin was washed with 800 ml. of distilled water and then eluted with 0.4 N hydrochloric acid-ethanol (1:2). The active fractions of eluate were collected to a total volume of 180 ml., adjusted to pH 6.0 by addition of 3N sodium hydroxide and then concentrated to 40 ml. under reduced pressure. The concentrated was adjusted to pH 8.0 by addition of 3N sodium hydroxide and then extracted twice with each 50 ml. of ethyl ether. The combined extracts of ethyl ether were then concentrated under reduced pressure to give 2.1 g. of pale yellow colored powder. This powder was dissolved in 10 ml. of ethyl acetate and the resultant solution was subjected to chromatography by passing through a column of 200 ml. of ethyl acetate impregnated alumina and developing with ethyl acetate. The active fractions of eluate were collected to a total volume of 200 ml., added with 40 ml. of distilled water, adjusted to pH 1.8 by addition of 5N hydrochloric acid and then shaken thoroughly. The aqueous phase was separated from the organic phase and the aqueous solution was adjusted to pH 8.5 by addition of 1N sodium hydroxide, so that a precipitate was deposited. This precipitate was filtered and dissolved in benzene and the solution was subjected to chromatographic isolation with silica gel in the same manner as in Example 1. A white colored powder consisting of the pure SF–837 substance was obtained at a yield of 300 mg.

EXAMPLE 4

The SF–837 strain, namely Streptomyces mycarofaciens identified as ATCC No. 21454 was inoculated to 300 l. of a liquid culture medium containing 2.0 percent glucose, 1 percent peptone, 0.5 percent meat-extract, 0.4 percent corn steep liquor 0.2 percent NaCl, 0.3 percent $CaCO_3$ and 0.2 percent lard at pH 7.0, and stirr-cultured at 28°C. for 70 hours under aeration.

The fermented broth was directly filtered, and the filter cake comprising mycelium cake was washed with diluted hydrochloric acid. The culture filtrate combined with the washing liquids was obtained at a total volume of 280 l. (potency, 320 mcg/ml.). The filtrate was extracted with 70 l. of ethyl acetate and 71 l. of the resulting ethyl acetate phase was concentrated to approximately 20 l. under reduced pressure. The concentrate was diluted with 10 l. of water, adjusted to pH 2 by addition of 5N hydrochloric acid and then shaken thoroughly. The aqueous phase was separated from the organic phase, adjusted to pH 9 by addition of 3N sodium hydroxide and then extracted with 4 l. of ethyl acetate. The resulting extract of ethyl acetate was then similarly shaken together with 2 l. of aqueous hydrochloric acid to transfer the active substances into the latter which was again extracted with one litre of ethyl acetate at pH 8. This ethyl acetate extract was then dried over anhydrous sodium sulfate and concentrated under reduced pressure to give 92 g. of a crude, yellow colored powder.

90 Grams of this crude powder were dissolved in 1 litre of ethyl acetate and the solution was passed through a column of 1.5 l. of ethyl acetate-impregnated carbon powder. The development was carried out using ethyl acetate as the solvent, and the active fractions of eluate were collected to a total volume of 5.5 l., which was then evaporated to dryness under reduced pressure to give 55 g. of a white colored powder (potency 700 mcg/mg.).

This powder was subjected to a counter-current distribution method with benzene and 0.3M phosphate buffer (pH 4.40) (2.5 l. of each solvent was used and the displacement of the lower mobile layer was effected 10 times.). The SF-837 substance was present distributed in the first to third tubes and predominantly in the second tube, and larger portions (about 80 percent) of the $SF-837-A_2$, $SF-837-A_3$ and $SF-837-A_4$ substances were present retained in the first tube.

The content (2.4 l.) in the first tube was concentrated under reduced pressure to give 7.7g. of a white colored powder (potency 720 mcg/mg.). This powder was dissolved in 15 ml. of benzene, some insoluble matters were filtered off and the filtered solution was then passed through a column of 800 ml. of benzene-impregnated silica gel. The adsorbed active substances were developed chromatographically using a solvent mixture of benzene-acetone (4:1) and collecting the eluate in fractions of each 50 ml. A minor portion of each of the fractions obtained was assayed by subjecting to alumina thin layer chromatography (with 2:1 ethyl acetate-benzene as the developing solvent). Fractions Nos. 28 to 30 which gave a single spot in the alumina thin layer chromatography were combined together and then concentrated in vacuo to give 140 mg. of a white colored powder of a melting point of 120° - 122°C. which was identified by analysis as the pure free base of the $SF-837-A_4$ substance.

Fractions Nos. 38 - 57 which gave three spots in the alumina thin layer chromatography were combined together and concentrated in vacuo to give 1.1g. of a white colored powder which was found by analysis to contain the $SF-837-A_2$ and $SF-837-A_3$ substances together with a minor amount of the SF-837 substance. Fractions Nos. 70 to 95 which gave a single spot in the alumina thin layer chromatography and in which the SF-837 substance was collected alone were then concentrated in vacuo to give 0.8g. of a white colored powder of a melting point of 122°- 124°C., which was identified by analysis to be the pure free base of the SF-837 substance.

EXAMPLE 5

In 4 ml. of benzene was dissolved 1g. of the white colored powder containing the $SF-837-A_2$ and $SF-837-A_3$ substances together with a monor amount of the SF-837 substance which had been recovered from the silica gel chromatography of Example 4. The solution was subjected to chromatographic separation by passing through a column of 100 ml. of benzene-impregnated alumina and developing with a solvent mixture of ethyl acetate-benzene (1:1). The eluate was taken in fractions of each 20 ml., and each fraction was assayed by subjecting to alumina thin layer chromatography (using 2:1 ethyl acetate-benzene as the developing solvent). The fractions Nos. 30 to 48 which gave a single spot in the just above-mentioned alumina thin layer chromatography were combined together and concentrated in vacuo to give 230 mg. of a white colored powder of a melting point of 122° - 125°C. which was found by analysis to consist of the pure free base of the $SF-837-A_3$ substance.

After the fraction No. 80 was eluted from the column, the developing solvent was changed into a mixture of ethyl acetate benzene (2:1), and the fractions Nos. 90 to 125 were collected together and concentrated in vacuo to give 280 mg. of a white colored powder which was found by analysis to contain about 70 percent by weight of the $SF-837-A_2$ substance. 250 Miligrams of this powder were dissolved in 3 ml. of benzene and the solution was agains subjected to chromatography by passing through a column of 50 ml. of benzene-impregnated alumina and developing with 300 ml. of ethyl acetate-benzene (1:3) and then with a mixture of ethyl acetate-benzene (2:1). The eluate was taken in fractions of each 5 ml., and each fraction was assayed by the alumina thin layer chromatography. Fractions Nos. 36 - 47 which gave a single spot in this alumina thin layer chromatography were combined together and concentrated in vacuo to yield 80 mg. of a white colored powder of a melting point of 125° - 128°C. which was identified by analysis to be the pure free base of the $SF-837-A_2$ substance.

EXAMPLE 6

The SF-837 strain, namely Streptomyces mycarofaciens was inoculated to 30 l. of a liquid culture medium comprising 3.0 percent glucose, 5 percent soluble vegetable protein, 0.2 percent KCl and 0.3 percent $CaCO_3$ at pH 7.0 and stirr cultured in a jar-fermenter at 30°C. for 85 hours with aeration. The fermented broth was directly filtered and the filter cake comprising the mycelium cake was washed with dilute hydrochloric acid. The culture filtrate combined with the washing liquid was obtained to a total volume of 28 l. (potency, 300 mcg/ml.). The filtrate (pH 8.4) was extracted with 7 l. of butyl acetate and the resulting butyl acetate extract was subsequently treated similarly to Example 4 so as to perform the reversal extraction of the active substances, whereby a crude, yellow colored powder was obtained at a yield of 15.2 g. In 200 ml. of butyl acetate was dissolved 15 g. of this crude powder, and the solution was subjected to chromatography by passing through a column of 400 ml. of butyl acetate-impregnated carbon and then developing with butyl acetate. The active fractions of the eluate were collected to a total volume of 1.8 l., and then concentrated in vacuo to approximately 220 ml. The concentrate was diluted with 50 ml. of distilled water, adjusted to pH 2 by additon of 6N hydrochloric acid and then shaken thoroughly. The aqueous phase was separated from the organic phase and this aqueous solution was adjusted to pH 9.0 by addition of 1N sodium hydroxide to deposit a precipitate. This precipitate was filtered and dried in a desiccator, yielding 6.3g. of a white colored powder (potency, 720 mcg/mg.).

This powder was dissolved in 12 ml. of benzene and the insoluble matters was filtered off. The filtered solution was then subjected to chromatography by passing through a column, of 600 ml. of benzene-impregnated silica gel and developing the adsorbed active substances with a mixed solvent of benzene-acetone (6:1). The eluate was taken in fractions of each 20 ml. The SF–837–$A_2$, SF–837–$A_3$ and SF–837–$A_4$ substances were eluted from the column before the SF–837 substance. Each of the fractions was tested by means of silica gel thin layer chromatography (using 2:1 benzene-acetone as the developing solvent). Fractions Nos. 64 to 82 were combined together and concentrated in vacuo to give 800 jmg. of a white colored powder which was found by analysis to contain the SF–837–$A_2$, SF–837–$A_3$ and SF–837–$A_4$ substances together with a minor amount of the SF–837 substance. This white colored powder was subsequently subjected to the chromatographic separation with a silica gel column in the same manner as in Example 4 and then to the chromatographic separation with an alumina column in the same manner as in Example 5, whereby 15 mg. of the pure SF–837–$A_2$ substance free base, 85 mg. of the pure SF–837–$A_3$ substance free base and 35 mg. of the pure SF–837–$A_4$ substance free base were recovered in the form of white colored powders, respectively.

Example 7

In 10 ml. of ethyl ether was dissolved 200 mg. of the SF–837 substance which was produced from the process of the Example 2, and the resulting solution was added dropwise with a saturated solution of citric acid. The precipitate formed was filtered and dried to give 230 mg. of the SF–837 substance citrate of a melting point of 162° – 167°C. (with decomposition).

When each 200 mg. of the free bases of the SF–837–$A_2$, SF–837–$A_3$ and SF–837–$A_4$ substances isolated in Examples 4 and 5 was treated with a saturated solution of citric acid in the same manner as mentioned above, there were obtained the corresponding citrates of the SF–837–$A_2$, SF–837–$A_3$ and SF–837–$A_4$ substances at yields of 210 mg., 220 mg. and 190 mg., respectively.

EXAMPLE 8

In 20 ml. of distilled water was suspended 300 mg. of the SF–837–$A_3$ substance, and to the resulting suspension was added an aqueous solution of tartaric acid. The mixture was agitated well and adjusted to pH 4. The mixture was filtered to remove some insoluble matter and the filtrate was freeze-dried to give 340 mg. of the SF–837–$A_3$ substance tartarate in the form of a white powder which melted at 115°C.

EXAMPLE 9

In 1.5 ml. of pyridine was dissolved 300 mg. of the SF–837 substance free base, and to the resulting solution was added 1.0 ml. of acetic anhydride. The mixture was agaitated and then allowed to stand at room temperature for 20 hours. The reaction mixture was then poured into ice-water and agitated to give a precipitate. This precipitate was filtered and dried in a desiccator to yield 330 mg. of a white powder. Recrystallisation of this powder from carbon tetrachloride gave 305 mg. of the di-acetyl derivative of the SF–837 substance in a form of white needles of a melting point of 122 – 125°C.

In a similar way, each 300mg. of the SF–837–$A_2$, SF–837–$A_3$ and SF–837–$A_4$ substances (free bases) was treated with an excess of acetic anhydride in solution of pyridine, so that the di-acetyl derivative of the SF–837–$A_2$ substance and the mono-aectyl derivatives of the SF–837–$A_3$ and SF–837–$A_4$ substances were obtained in the form of white crystals at yields of 310 mg. (m.p. 130° – 134°C.), 295 mg. (m.p. 182° – 185°C.) and 300 mg.(m.p. 166° – 168°C.), respectively.

What we claim is:

1. An antibiotic substance effective in inhibiting the growth of Gram-positive bacteria, selected from the group consisting of SF–837 substance, the SF–837–$A_2$ substance, the SF–837–$A_3$ substance, the SF–837–$A_4$ substance, acid-addition salts thereof and the di-acetyl derivative of the SF–837 substance each of the SF–837, SF–837–$A_2$, SF–837–$A_3$ and SF–837–$A_4$ substances being such a substance which is soluble in methanol, ethanol, acetone, chloroform, ethyl acetate, butyl acetate, acidified water, benzene, ethyl ether and carbon tetrachloride but is sparingly soluble in petroleum ether, n-hexane and neutral water, which is basic, forms salts with acids, which is positive in the erythromycin test with 50 percent sulfuric acid but is negative in the reactions with ninhydrin reagent and ferric chloride reagent, which contains only the elements carbon, hydrogen, nitrogen and oxygen, which is levorotatory in ethanol and which exhibits the characteristic of the macrolide antibiotics; the detailed, properties of the SF–837 substance being that the SF–837 substance free base forms a white powder having a melting point of 122° – 124°C., shows a pKa' value of 6.9 in 50 percent aqueous ethanol, gives an elementary analysis C 60.38 percent, H 8.35 percent, N 1.65 percent and 0 the balance (29.62 percent), shows a molecular weight of 813 as determined by mass analysis, hence has an empirical formula $C_{41}H_{67}O_{15}N$, exhibits optical rotation of $[\alpha]_D^{22}$–67° at a concentration of 1 percent in ethanol, exhibits a characteristic absorption maximum in the ultra-violet spectrum when dissolved in ethanol at the following wave length in m$\mu$: 232 ($E_{1cm}^{1\%}$ = 325) and exhibits characteristic absorption bands in the infra-red spectrum when pelleted in the form of the free base in potassium bromide at the following wave numbers in cm$^{-1}$: 3500, 2970, 2930, 1735, 1460, 1408, 1376, 1360, 1330, 1295, 1275, 1190, 1165, 1120, 1082, 1050, 1015, 910, 860, 840, 805, 780, 735 and 680; the di-acetyl derivative of the SF–837 substance forms white colored needles of a melting point of 122° – 125°C. when recrystallized from carbon tetrachloride, gives an elementary analysis C 60.35 percent, H 8.02 percent, N 1.58 percent and O 30.05 percent (balance) and hence an empirical formula $C_{45}H_{71}O_{17}N$, exhibits a characteristic absorption maximum at 232 mμ ($E_{1cm}^{1\%}$ = 295) in the ultraviolet spectrum when dissolved in ethanol and exhibits characteristic absorption bands in the infrared spectrum when pelleted in potassium bromide at the following wave numbers in $cm^{-1}$: 3450, 2970, 2930, 1728, 1454, 1368, 1232, 1167, 1122, 1082, 1054, 1024, 1002, 957, 907, 863, 837, 783 and 762; and the detailed properties of the SF-837-$A_2$ substance being that the SF-837-$A_2$ substance free base forms a white colored powder having a melting point of 125°-128°C., shows a pKa' value of 6.8 in 50 percent aqueous ethanol, gives an elementary analysis C 60.58 percent, H 8.85 percent, N 1.72 percent and O the balance (28.85 percent), shows a molecular weight of 827 as determined by mass analysis, hence has an empirical formula $C_{42}H_{69}O_{15}N$, exhibits an optical rotation of $[\alpha]_D^{22}$ −68° at a concentration of 1 percent in ethanol, exhibits a characteristic absorption maximum at a wave length of 232 mμ ($E_{1cm}^{1\%}$ = 320) in the ultraviolet spectrum when dissolved in ethanol and exhibits characteristic absorption bands in the infrared spectrum when pelleted in the form of the free base in potassium bromide at the following wave numbers in $cm^{-1}$: 3500, 2970, 2935, 1737, 1460, 1410, 1377, 1360, 1300, 1275, 1190, 1170, 1123, 1082, 1052, 1017, 990, 920, 910, 860, 840, 805, 780, 740 and 700; and the detailed properties of the SF-837-$A_3$ substance being that the SF-837-$A_3$ substance free base forms a white colored powder having a melting point of 122°-125°C., shows a pKa' value of 7.0 in 50 percent aqueous ethanol, gives an elementary analysis C 60.53 percent, H 8.23 percent, N 1.87 percent and O the balance (29.32 percent), shows a molecular weight of 811 as determined by mass analysis, hence has an empirical formula $C_{41}H_{65}O_{15}N$, exhibits an optical rotation of $[\alpha]_D^{22}$ −42° at a concentration of 1 percent in ethanol, exhibits a characteristic absorption maximum at a wave length of 280 mμ ($E_{1cm}^{1\%}$ + 295) in the ultra-violet spectrum when dissolved in ethanol and exhibits characteristic absorption bands in the infra-red spectrum when pelleted in the form of the free base in potassium bromide at the following wave numbers in $cm^{-1}$: 3500, 2970, 2930, 1738, 1680, 1640, 1600, 1460, 1378, 1360, 1300, 1275, 1252, 1190, 1168, 1121, 1083, 1052, 1015, 980, 910, 863, 840, 805 and 780; and the detailed properties of the SF-837-$A_4$ substance being that the SF-837-$A_4$ substance free base forms a white colored powder having a melting point of 120°-122°C., shows a pKa' value of 7.0 in 50 percent aqueous ethanol, gives an elementary analysis C 60.82 percent, H 8.52 percent, N 1.73 percent and O the balance (28.93 percent), shows a molecular weight of 825 as determined by mass analysis, hence has an empirical formula $C_{42}H_{67}O_{15}N$, exhibits an optical rotation of $[\alpha]_D^{22}$ −40° at a concentration of 1 percent in ethanol, exhibits a characteristic absorption maximum at a wave length of 280 mμ ($E_{1cm}^{1\%}$ = 285) in the ultraviolet spectrum when dissolved in ethanol and exhibits characteristic absorption bands in the infrared spectrum when pelleted in the form of the free base in potassium bromide at the following wave numbers in $cm^{-1}$: 3500, 2970, 2930, 1738, 1680, 1640, 1600, 1460, 1378, 1360, 1300, 1276, 1252, 1190, 1170, 1120, 1082, 1052, 1017, 980, 920, 910, 863, 840 and 780.

2. The free base, acid-addition salt or di-acetyl derivative of the SF-837 substances as claimed in Claim 1.

3. A mixture of the SF-837, SF-837-$A_2$, SF-837-$A_3$ and SF-837-$A_4$ substances as claimed in Claim 1.

4. A process for the production of the SF-837 substance, the SF-837-$A_2$ substance, the SF-837-$A_3$ substance and the SF-837-$A_4$ substance as defined in claim 1, which comprises cultivating a strain of Streptomyces mycarofaciens ATCC 21454 in a culture medium containing assimilable nitrogen and carbon sources under aerobic conditions to produce and accumulate the SF-837 substance, the SF-837-$A_2$ substance, the SF-837-$A_3$ substance and the SF-837-$A_4$ substance in the culture, and then recovering these antibiotic substances in mixture from the culture.

5. A process for the production of the free bases of the SF-837 substance, the SF-837-$A_2$ substance, the SF-837-$A_3$ substance and the SF-837-$A_4$ substance as defined in claim 1, which comprises cultivating a strain of Streptomyces mycarofaciens ATCC No. 21454 in a liquid culture medium containing assimilable carbon and nitrogen sources under aerobic conditions to produce and accumulate the SF-837 substance, the SF-837-$A_2$ substance, the SF-837-$A_3$ substance, and the SF-837-$A_4$ substance in the culture, and then isolating a mixture of the SF-837 substance, the SF-837-$A_2$ substance, the SF-837-$A_3$ substance and the SF-837-$A_4$ substance from the culture and subsequently separating these antibiotic substances from each other.

6. A process for the production of the free bases of the SF-837 substance, the SF-837-$A_2$ substance, the SF-837-$A_3$ substance and the SF-837-$A_4$ substance as defined in claim 1 each in the isolated form, which comprises culturing a strain of Streptomyces mycarofaciens ATCC No. 21454 a liquid culture medium containing assimilable carbon and nitrogen sources at a temperature of 20° to 30°C. under aerobic conditions until a significant antibacterial activity is given to the culture broth, filtering the culture, extracting the culture filtrate at a pH of 7 – 9 with a water-immiscible organic solvent for the SF-837, SF-837-$A_2$, SF-837-$A_3$ and SF-837-$A_4$ substances, selected from the group consisting of ethyl acetate, butyl acetate, chloroform, ethyl ether, methyl isobutyl ketone and butanol, then re-extracting the resultant organic extract containing the active substances with dilute aqueous acid selected from the group consisting of aqueous hydrochloric acid, and aqueous sulfuric acid, making the resulting aqueous extract alkaline by addition of alkali, again extracting the aqueous extract with one of the water-immiscible organic solvents to transfer the active substances into the latter orgainc solvent, repeating this transfer of the active substances from an organic extract in an amount of a water-immiscible organic solvent into dilute aqueous acid and then into another amount of the water-immiscible organic solvent, concentrating the finally resulting organic solution of the active substance so partly purified to dryness in vacuo, dissolving the resultant crude powder of the mixed active substances in ethyl acetate or butyl acetate, passing the solution through a column of activated carbon, developing with ethyl acetate or butyl acetate, collecting the active fractions of the eluate, concentrating the active fractions to a smaller volume, extracting the concentrate with aqueous diluted hydrochloric acid, making the aqueous extract alkaline by addition of an alkali, separating the formed precipitate substantially made of the mixed active substances, dissolving the precipitate in benzene, subjecting the benzene solution to chromatography with a silica gel column and using a mixture of benzene-acetone as the developing solvent, collecting the eluate in fractions, testing each of the fractions by alumina thin layer chromatography, combining together and concentrating to dryness in vacuo only the fractions which give a single spot characteristic to the SF–837–$A_4$ substance in this alumina thin layer chromatography, whereby the free base of the SF–837–$A_4$ substance is yielded in the form of pure powder, combining together and concentrating to dryness in vacuo only the fractions which give a single spot characteristic to the SF–837 substance in the alumina thin layer chromatography, whereby the free base of the SF–837 substance is yielded in the form of pure powder, combining together and concentrating to dryness in vacuo the fractions which are eluted from said silica gel column after the abovementioned fractions giving the single characteristic spot of the SF–837–$A_4$ substance but before the abovementioned fractions giving the single characteristic spot of the SF–837 substance and which contain in solution both the SF–837–$A_2$ and SF–837–$A_3$ substances together with a minor proportion of the SF–837 substance, whereby a powder of a mixture of the SF–837–$A_2$ and SF–837–$A_3$ substances together with a minor proportion of the SF–837 substance is obtained, dissolving this powder in benzene, subjecting the resultant solution of said powder in benzene to chromatography of a column of activated alumina and using a mixture of ethyl acetate-benzene and then a mixture of ethyl acetate-benzene as the developing solvent, collecting the eluate therefrom in fractions, testing each of these fractions by an alumina thin layer chromatography, combining together and concentrating to dryness in vacuo only the fractions which give a single spot characteristic to the SF–837–$A_3$ substance in the just above-mentioned alumina thin layer chromatography, whereby the free base of the SF–837–$A_3$ substance is yielded in the form of pure powder, also combining together and concentrating to dryness in vacuo the remaining fractions of the eluate from the above-mentioned activated alumina column to give a powder mainly containing the SF–837–$A_2$ substance, again dissolving this powder in benzene, then subjecting this benzene solution again to chromatography of a column of activated alumina and using a mixture of ethyl acetate-benzene as the developing solvent, collecting the eluate therefrom in fractions, testing each of the fractions by alumina thin layer chromatography, combining together and concentrating to dryness in vacuo only the fractions which give a single spot characteristic to the SF–837–$A_2$ substance in the just above alumina thin layer chromatography, whereby the free base of the SF–837–$A_2$ substance is yielded in the form of pure powder.

* * * * *